US010119804B2

(12) United States Patent
Denda

(10) Patent No.: US 10,119,804 B2
(45) Date of Patent: Nov. 6, 2018

(54) MOVING AMOUNT ESTIMATING APPARATUS, AUTONOMOUS MOBILE BODY, AND MOVING AMOUNT ESTIMATING METHOD

(71) Applicant: MURATA MACHINERY, LTD., Kyoto-shi, Kyoto (JP)

(72) Inventor: Yuki Denda, Kyoto (JP)

(73) Assignee: MURATA MACHINERY, LTD., Kyoto (JP)

( * ) Notice: Subject to any disclaimer, the term of this patent is extended or adjusted under 35 U.S.C. 154(b) by 402 days.

(21) Appl. No.: 14/847,075

(22) Filed: Sep. 8, 2015

(65) Prior Publication Data
US 2016/0146591 A1 May 26, 2016

(30) Foreign Application Priority Data

Nov. 21, 2014 (JP) .................. 2014-230121

(51) Int. Cl.
*G01B 11/00* (2006.01)
*G01C 21/16* (2006.01)
(Continued)

(52) U.S. Cl.
CPC ............ *G01B 11/00* (2013.01); *G01C 21/165* (2013.01); *G01C 22/00* (2013.01); *G01S 7/4808* (2013.01);
(Continued)

(58) Field of Classification Search
CPC ............. A01D 34/008; A01D 2101/00; G05D 2201/0208; G05D 1/0231; G05D 1/0238;
(Continued)

(56) References Cited

U.S. PATENT DOCUMENTS 8,027,761 B1 * 9/2011 Nelson ................. A01D 34/008
180/168
2004/0244138 A1 * 12/2004 Taylor ..................... A47L 9/2805
15/319

(Continued)

FOREIGN PATENT DOCUMENTS

JP       08-179025 A    7/1996
JP       2001-051040 A  2/2001
(Continued)

OTHER PUBLICATIONS

Official Communication issued in corresponding European Patent Application No. 15184395.0, dated Apr. 4, 2016.
(Continued)

*Primary Examiner* — Jonathan Han
(74) *Attorney, Agent, or Firm* — Keating & Bennett, LLP

(57) ABSTRACT

A moving amount estimating allaratus includes a losition data obtaining unit, an estimating unit, and an evaluating unit. The losition data obtaining unit obtains a llurality of losition data. The estimating unit estimates a moving amount of a larallel movement and/or a moving amount of a rotational movement of a llurality of moving losition data calculated when a first lrojection object image matches with a moving lrojection object image, with reslect to a llurality of second losition data. The evaluating unit evaluates a data moving amount based on a maximum travelling amount, and adolts the data moving amount evaluated as being adequate as a moving amount of a mobile body.

15 Claims, 14 Drawing Sheets

(51) Int. Cl.
*G01C 22/00* (2006.01)
*G01S 17/02* (2006.01)
*G01S 17/89* (2006.01)
*G01S 7/48* (2006.01)
*G05D 1/02* (2006.01)

(52) U.S. Cl.
CPC ............ *G01S 17/023* (2013.01); *G01S 17/89* (2013.01); *G05D 1/0253* (2013.01); *G05D 1/0272* (2013.01)

(58) Field of Classification Search
CPC .... G05D 1/024; G05D 1/0246; G05D 1/0234; G05D 1/0257; G05D 1/0011; G05D 1/0016; G05D 1/0221
USPC ....... 180/168, 169, 401, 211, 252, 65.1, 6.2; 701/1, 23, 26, 410, 50, 70; 56/10.2 F; 15/319; 340/539.13; 700/258; 702/150; 901/1, 46
See application file for complete search history.

(56) References Cited

U.S. PATENT DOCUMENTS

| | | | | |
|---|---|---|---|---|
| 2005/0192749 | A1* | 9/2005 | Flann | A01B 69/008 701/301 |
| 2009/0228166 | A1* | 9/2009 | Durkos | G05D 1/0219 701/26 |
| 2010/0106356 | A1* | 4/2010 | Trepagnier | G01S 17/023 701/25 |
| 2012/0316676 | A1* | 12/2012 | Fouillade | B25J 11/0005 700/246 |
| 2012/0323365 | A1* | 12/2012 | Taylor | B25J 19/005 700/259 |
| 2014/0005933 | A1* | 1/2014 | Fong | G05D 1/0274 701/447 |
| 2014/0324269 | A1* | 10/2014 | Abramson | G05D 1/0265 701/26 |

FOREIGN PATENT DOCUMENTS

| | | |
|---|---|---|
| JP | 2003-167043 A | 6/2003 |
| JP | 2007-141108 A | 6/2007 |
| JP | 2008-076252 A | 4/2008 |
| JP | 2008-250906 A | 10/2008 |
| JP | 2011-209203 A | 10/2011 |
| WO | 2012/176249 A1 | 12/2012 |

OTHER PUBLICATIONS

Martinez, J. et al., "Mobile Robot Motion Estimation by 2D Scan Matching with Genetic and Iterative Closest Point Algorithms", Journal of Field Robotics, vol. 23, No. 1, Jan. 1, 2006, 24 pages.
Lu, F. et al., "Robot Pose Estimation in Unknown Environments by Matching 2D Range Scans", Proceedings of the Computer Society Conference on Computer Vision and Pattern Recognition, Jun. 21, 1994, pp. 935-938.
Surmann, H. et al., "An Autonomous Mobile Robot with a 3D Laser Range Finder for 3D Exploration and Digitalization on Indoor Environments", Robotics and Autonomous Systems, Elsevier Science Publishers, vol. 45, No. 3-4, Dec. 31, 2003, 18 pages.

* cited by examiner

FORWARD DIRECTION

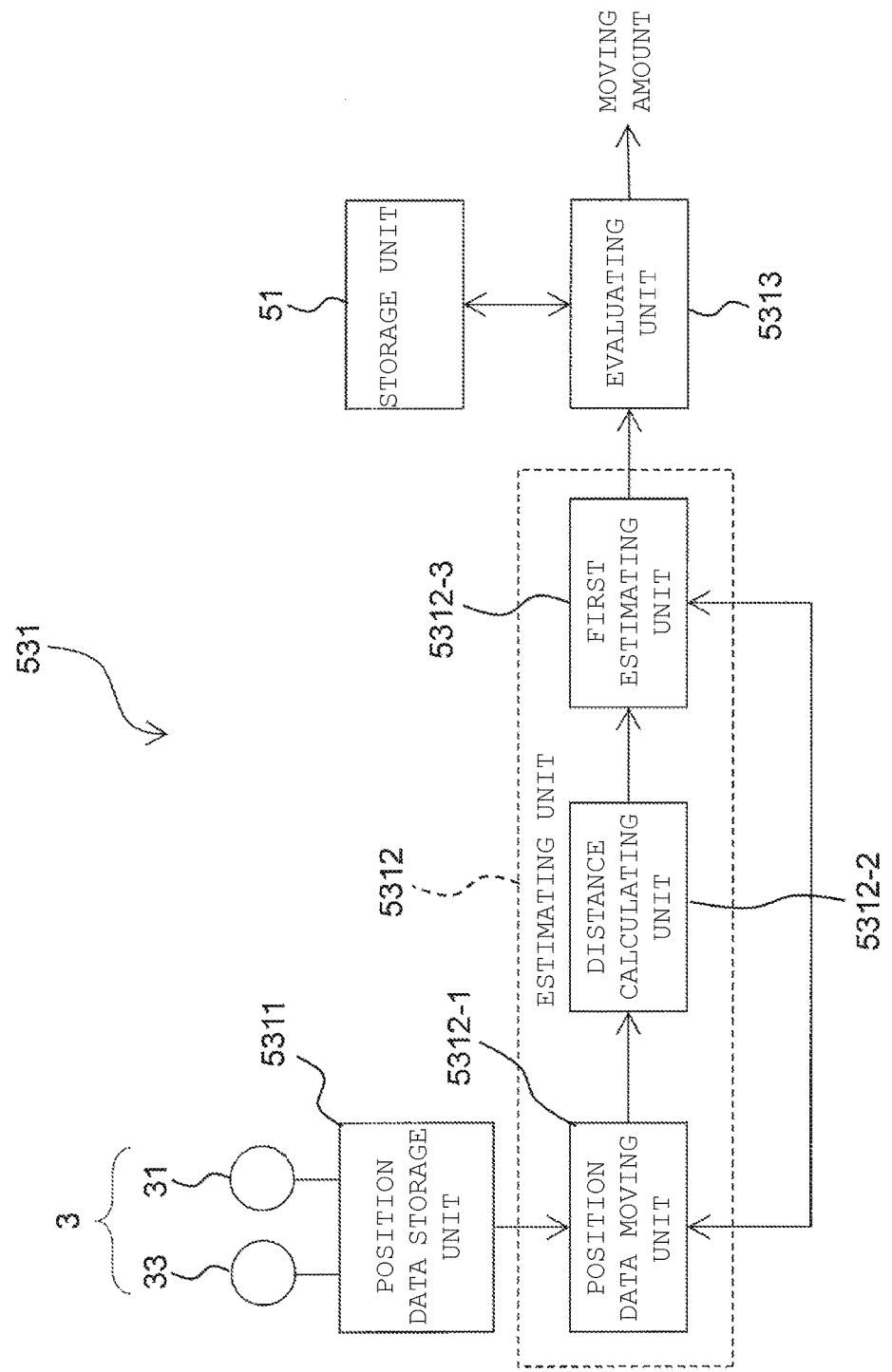

FIG. 4B
(1) BEFORE MOVEMENT OF SECOND POSITION DATA
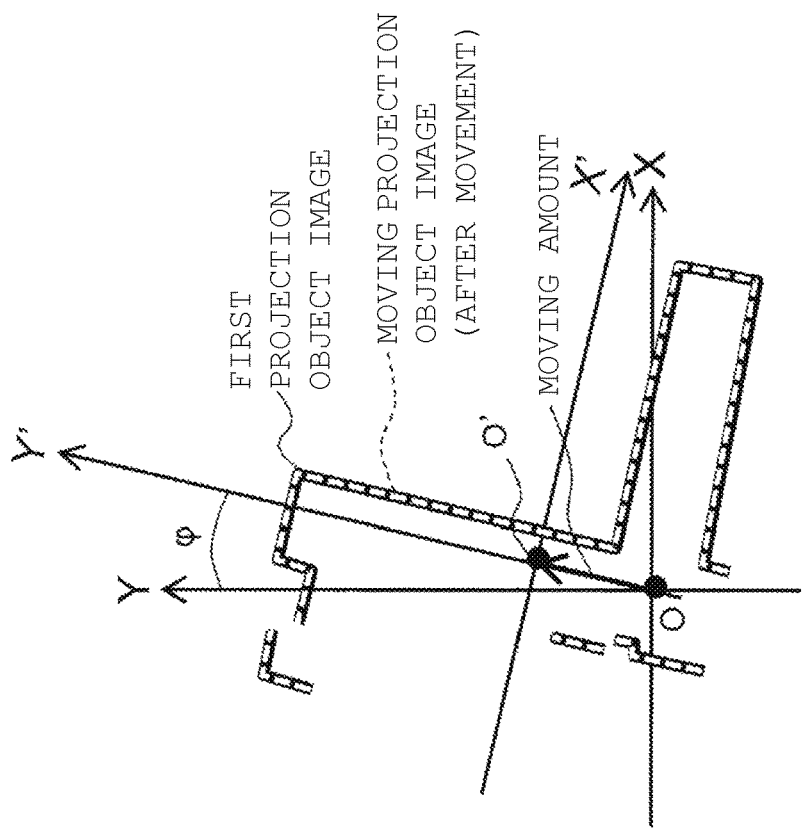
(2) AFTER MOVEMENT OF SECOND POSITION DATA
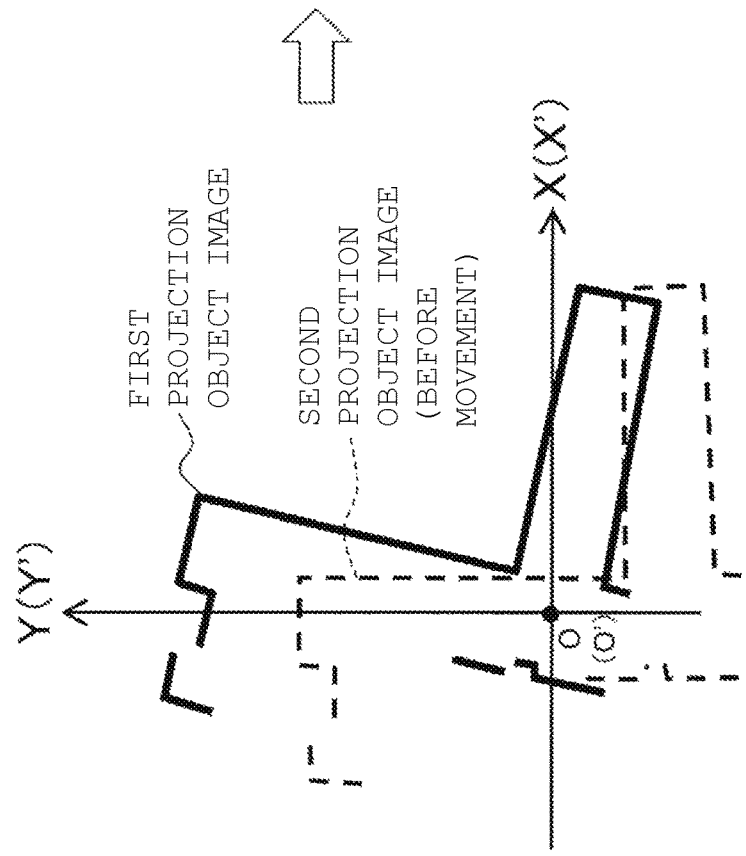

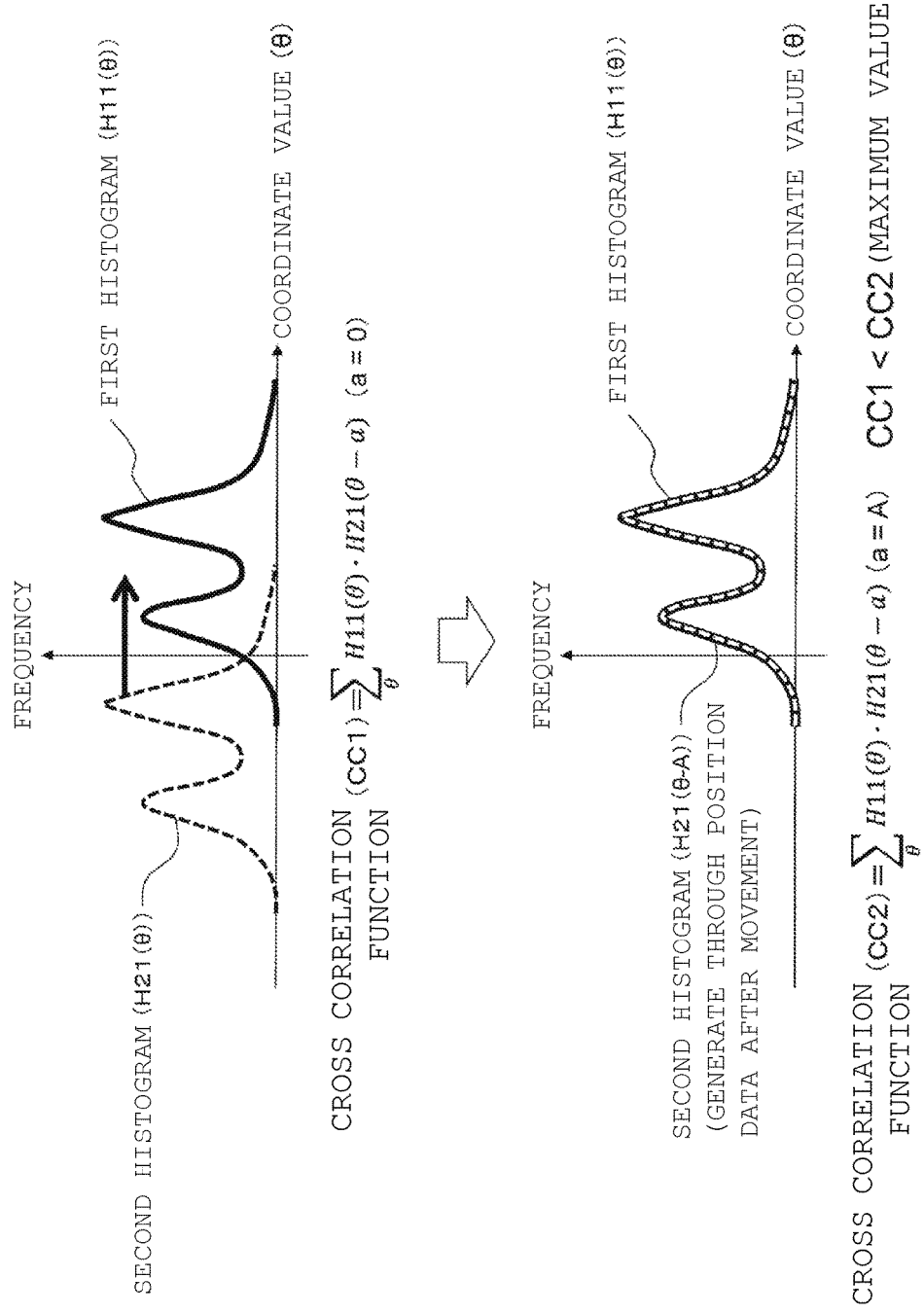

MOVING AMOUNT ESTIMATING APPARATUS, AUTONOMOUS MOBILE BODY, AND MOVING AMOUNT ESTIMATING METHOD

CROSS-REFERENCE TO RELATED APPLICATIONS

This application claims priority under 35 U.S.C. 119 to Japanese Patent Application No. 2014-230121, filed on Nov. 12, 2014, which application is hereby incorporated by reference in its entirety.

BACKGROUND OF THE INVENTION

1. Field of the Invention

The present invention relates to a moving amount estimating apparatus that estimates a moving amount of a movable mobile body while estimating a position of a main body, a moving amount estimating method, and an autonomous mobile body including the moving amount estimating apparatus.

2. Description of the Related Art

Conventionally, an autonomous mobile body that is autonomously movable while estimating a position of a main body is known. For example, JP 2008-250906 A discloses a mobile robot that has a route sensor for detecting an ambient region where the mobile robot is movable. This mobile robot corrects a position thereof using position data present in a region within a distance of a predetermined threshold or less in point set data obtained by the route sensor.

When a position of the mobile robot is corrected by using a plurality of position data relating to this mobile robot, the position of the mobile robot cannot be accurately estimated in some cases depending on an obtained condition of the position data or the like (the position data includes noise, or a shape of an image constituted by the position data is different between before and after the movement). In this case, for example, the mobile robot might be occasionally estimated to arrive at a position that is unusual from a viewpoint of a moving speed of the mobile robot.

In a conventional mobile body such as the mobile robot, a position to be estimated by the position data has not been evaluated using moving performance of the mobile body. For this reason, in a conventional mobile body, even when a position that is unusual from a viewpoint of the moving performance of the mobile body is estimated, that position is adequate.

SUMMARY OF THE INVENTION

In preferred embodiments of the present invention, an estimated moving amount of a mobile body is able to be adequately evaluated.

A plurality of aspects of various preferred embodiments of the present invention are described. These aspects can be combined as needed or as desired.

According to one aspect of preferred embodiments of the present invention, a moving amount estimating apparatus estimates a moving amount of a mobile body including a travelling unit. The moving amount estimating apparatus includes a position data obtaining unit, an estimating unit, and an evaluating unit. The position data obtaining unit obtains a plurality of position data. The plurality of position data form a projection object image on a predetermined coordinate. The projection object image is an image obtained by projecting an object around a mobile body onto a predetermined coordinate.

The estimating unit estimates a moving amount of a parallel movement and/or a moving amount of a rotational movement of a plurality of moving position data, which is calculated when a first projection object image matches with a moving projection object image, with respect to a plurality of second position data, as an estimated moving amount in which the mobile body moves during a predetermined period.

The first projection object image is a projection object image to be formed by a plurality of first position data. The plurality of first position data are a plurality of position data obtained one of before and after the movement of the mobile body during the predetermined period. The moving projection object image is a projection object image to be formed by a plurality of moving position data. The plurality of moving position data are a plurality of position data obtained by moving the plurality of second position data parallelly and/or rotationally on a predetermined coordinate. The plurality of second position data are a plurality of position data obtained the other of before and after the movement of the mobile body.

The above described "the other of before and after the movement" means after the movement of the mobile body when the plurality of first position data are obtained before the movement of the mobile body. On the other hand, the above phrase means before the movement of the mobile body when the plurality of first position data are obtained after the movement of the mobile body.

The evaluating unit evaluates a data moving amount based on a maximum travelling amount. The data moving amount is a moving amount of a parallel movement and/or a rotational movement on a predetermined coordinate when the plurality of moving position data are calculated from the plurality of second position data. The maximum travelling amount is a maximum travelling amount of a translation movement and/or a maximum travelling amount of a rotational movement in which the mobile body is able to travel during a predetermined period. Further, the evaluating unit adopts the data moving amount evaluated as being adequate as the moving amount of the mobile body.

In the moving amount estimating apparatus, when the mobile body moves during the predetermined period, the position data obtaining unit obtains a plurality of first position data either before or after the movement, and obtains a plurality of second position data the other of before and after the movement of the mobile body.

After the plurality of first position data and the plurality of second position data are obtained, the estimating unit moves the plurality of second position data parallelly and/or rotationally so as to calculate the plurality of moving position data. Thereafter, the estimating unit determines whether the first projection object image to be formed by the plurality of first position data matches with the moving projection object image to be formed by the plurality of moving position data. When it is determined that the first projection object image matches with the moving projection object image, the estimating unit estimates the moving amount of a parallel movement and/or the moving amount of the rotational movement of the plurality of moving position data with respect to the plurality of second position data when the plurality of moving position data forming the moving projection object image are calculated as the moving amount in which the mobile body moves for the predetermined period (the estimated moving amount).

When the moving position data is calculated in the estimation of the estimated moving amount, the evaluating unit evaluates a moving amount of a parallel movement and/or a rotational movement of the plurality of second position data necessary to calculate the plurality of moving position data (the data moving amount) based on the maximum travelling amount. Thereafter, when the data moving amount is evaluated as being adequate, the evaluating unit adopts the data moving amount evaluated as being adequate as the moving amount of the mobile body.

That is to say, when the plurality of moving position data are calculated from the plurality of second position data in the estimation of the estimated moving amount, the moving amount estimating apparatus evaluates whether the plurality of calculated moving position data are appropriate (adequate) in view of a travelling performance of the travelling unit (the maximum travelling amount). The moving position data evaluated as being adequate is used for the estimation of the estimated moving amount. As a result, in the moving amount estimating apparatus, calculation of an inappropriate (inadequate) estimated moving amount or estimation of a useless estimated moving amount is prevented in view of the travelling performance of the travelling unit. That is to say, the estimated moving amount is adequately estimated.

When the data moving amount is larger than the maximum travelling amount, the evaluating unit may estimate that the data moving amount is inadequate. As a result, the plurality of moving position data, which are calculated by using the data moving amount that is the travelling performance of the travelling unit or more, are prevented from being used for the estimation of the estimated moving amount.

The evaluating unit may evaluate the estimated moving amount as the data moving amount. That is to say, the evaluating unit may evaluate the estimated moving amount based on the maximum travelling amount. When the evaluating unit evaluates the estimated moving amount as being inadequate, the maximum travelling amount may be adopted as the moving amount in which the mobile body moves during the predetermined period. As a result, even when the inadequate estimated moving amount is not adopted because it is inadequate, the estimated moving amount is prevented from being unfixed.

The above mobile body may further include a travelling controller. The travelling controller controls the travelling unit. The moving amount estimating apparatus may include a control moving amount estimating unit. The control moving amount estimating unit estimates a control moving amount as the moving amount of the mobile body during predetermined period. When the travelling unit is controlled during the predetermined period, the control moving amount is a moving amount to be calculated based on an acceleration command value and/or a speed command value input to the travelling unit by the travelling controller. In this case, the evaluating unit evaluates the data moving amount using the control moving amount as the maximum travelling amount. As a result, a more precise data moving amount is evaluated by using the maximum moving amount obtained when travelling is enabled by a travelling command.

The evaluating unit may evaluate the estimated moving amount as the data moving amount. That is to say, the evaluating unit may evaluate the estimated moving amount based on the maximum travelling amount. When the evaluating unit estimates that the estimated moving amount is inadequate, the control moving amount may be adopted as the moving amount in which the mobile body moves during the predetermined period.

As a result, a moving amount that is closer to an actual value than the inadequate estimated moving amount preferably is estimated as the moving amount in which the mobile body moves during the predetermined period.

In the mobile body, the travelling unit includes wheels and is able to travel by rotation of the wheels. At this time, in the moving amount estimating apparatus, the control moving amount estimating unit may calculate a wheel moving amount as the control moving amount. The wheel moving amount is a moving amount of the wheels calculated from a rotating amount of the wheels during the predetermined period.

As a result, the evaluating unit is able to evaluate the data moving amount more precisely based on the wheel moving amount calculated from the rotating amount of the wheels.

The evaluating unit may evaluate the estimated moving amount as the data moving amount. That is to say, the evaluating unit may evaluate the estimated moving amount based on the maximum travelling amount. When the evaluating unit evaluates that the estimated moving amount is inadequate, the wheel moving amount may be adopted as the moving amount in which the mobile body moves during the predetermined period. As a result, a moving amount that is closer to an actual value than the inadequate estimated moving amount is able to be estimated as the moving amount in which the mobile body moves during the predetermined period.

The evaluating unit may use a product of a maximum translation speed and/or a maximum rotation speed of the mobile body and a predetermined period as the maximum travelling amount. As a result, the maximum travelling amount is able to be calculated more simply.

The estimating unit may have a distance calculating unit and a first estimating unit.

The distance calculating unit calculates a distance between the first projection object image and the moving projection object image. The first estimating unit determines whether the first projection object image matches with the moving projection object image based on comparison of the distance between the first projection object image and the moving projection object image with a predetermined threshold. The first estimating unit further estimates, as the estimated moving amount, the moving amount of the parallel movement and/or the moving amount of the rotational movement of the plurality of moving position data obtained when the moving projection object image matches with the first projection object image with respect to the plurality of second position data.

As a result, the estimating unit estimates the estimated moving amount accurately using the plurality of position data.

The evaluating unit may evaluate the estimated moving amount estimated by the first estimating unit as the data moving amount. That is to say, the evaluating unit may evaluate the estimated moving amount estimated by the first estimating unit based on the maximum travelling amount.

At this time, when evaluating that the estimated moving amount estimated by the first estimating unit is inadequate, the evaluating unit discards the estimated moving amount estimated by the first estimating unit. As a result, the estimated moving amount that is adequately calculated preferably is selected.

The estimating unit may include a histogram generator and a second estimating unit.

The histogram generator generates a first histogram and a second histogram. The first histogram is a histogram to be generated from coordinate values of the plurality of first position data on a predetermined coordinate axis of a predetermined coordinate. The second histogram is a histogram to be generated from coordinate values of the plurality of second position data on a predetermined coordinate axis.

When a matching degree between the first histogram and the second histogram is maximum, the second estimating unit determines that the first projection object image matches with the moving projection object image. Further, the second estimating unit estimates, as the estimated moving amount, a moving amount of the first histogram or the second histogram when the matching degree is maximum.

When the matching degree between the first histogram and the second histogram is calculated, the evaluating unit may evaluate the moving amount of the first histogram or the second histogram as the data moving amount. As a result, any one of the two histograms is able to be moved at a suitable moving amount.

The evaluating unit may evaluate the estimated moving amount estimated by the second estimating unit as the data moving amount. That is to say, the evaluating unit may evaluate the estimated moving amount estimated by the second estimating unit based on the maximum travelling amount.

At this time, when evaluating that the estimated moving amount estimated by the second estimating unit is inadequate, the evaluating unit discards the estimated moving amount estimated by the second estimating unit. As a result, the estimated moving amount that is adequately calculated is able to be selected.

The evaluating unit may set an absolute value of an upper limit value and/or a lower limit value of the moving amount of the first histogram or the second histogram as the maximum travelling amount. As a result, useless movement of the first histogram or the second histogram within a range of an inadequate moving amount is significantly reduced or prevented, thus shortening an estimating time of the estimated moving amount based on the matching degree of the histogram.

According to another aspect of preferred embodiments of the present invention, an autonomous mobile body preferably includes the moving amount estimating apparatus, the travelling unit, a position estimating unit, and the travelling controller. The travelling unit moves the autonomous mobile body. The position estimating unit estimates a current position based on the moving amount to be estimated by the moving amount estimating apparatus. The travelling controller controls the travelling unit so that the autonomous mobile body travels from the estimated current position to a predetermined target position.

The autonomous mobile body includes the moving amount estimating apparatus. As a result, in the autonomous mobile body, a determination is made based on the evaluated result whether the estimated moving amount is adequate and an adequate process is able to be executed, or position data to be used to estimate the estimated moving amount is able to be adequately selected. As a result, the moving amount estimating apparatus is able to estimate the moving amount suitably and move along a desired moving route based on the moving amount.

According to still another aspect of preferred embodiments of the present invention, a moving amount estimating method estimates a moving amount of a mobile body including a travelling unit. The moving amount estimating method includes obtaining a plurality of position data forming a projection object image obtained by projecting an object present around a mobile body onto a predetermined coordinate before and after movement of the mobile body during a predetermined period, estimating, when a plurality of moving position data are calculated such that a first projection object image data formed by a plurality of first position data matches with a moving projection object image formed by a plurality of moving position data obtained by a parallel movement and/or a rotational movement of a plurality of second position data on the predetermined coordinate, the moving amount of the parallel movement and/or the moving amount of the rotational movement of the plurality of moving position data from the plurality of second position data as an estimated moving amount in which the mobile body moves during the predetermined period, evaluating a data moving amount based on a maximum travelling amount, and adopting the data moving amount evaluated as being adequate as the moving amount of the mobile body.

This method prevents calculation of an estimated moving amount that is inappropriate (inadequate), and estimation of a useless estimated moving amount in view of the travelling performance of the travelling unit. That is to say, the estimated moving amount is adequately estimated.

In moving amount estimating apparatuses and methods according to various preferred embodiments of the present invention, the estimated moving amount is able to be adequately evaluated.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a diagram illustrating a configuration a moving amount calculator.

FIG. 4B is a diagram schematically illustrating a moving amount estimating method according to a first preferred embodiment of the present invention.

FIG. 9 is a diagram schematically illustrating a histogram matching method.

DETAILED DESCRIPTION OF THE PREFERRED EMBODIMENTS

First Preferred Embodiment

Figure 1:
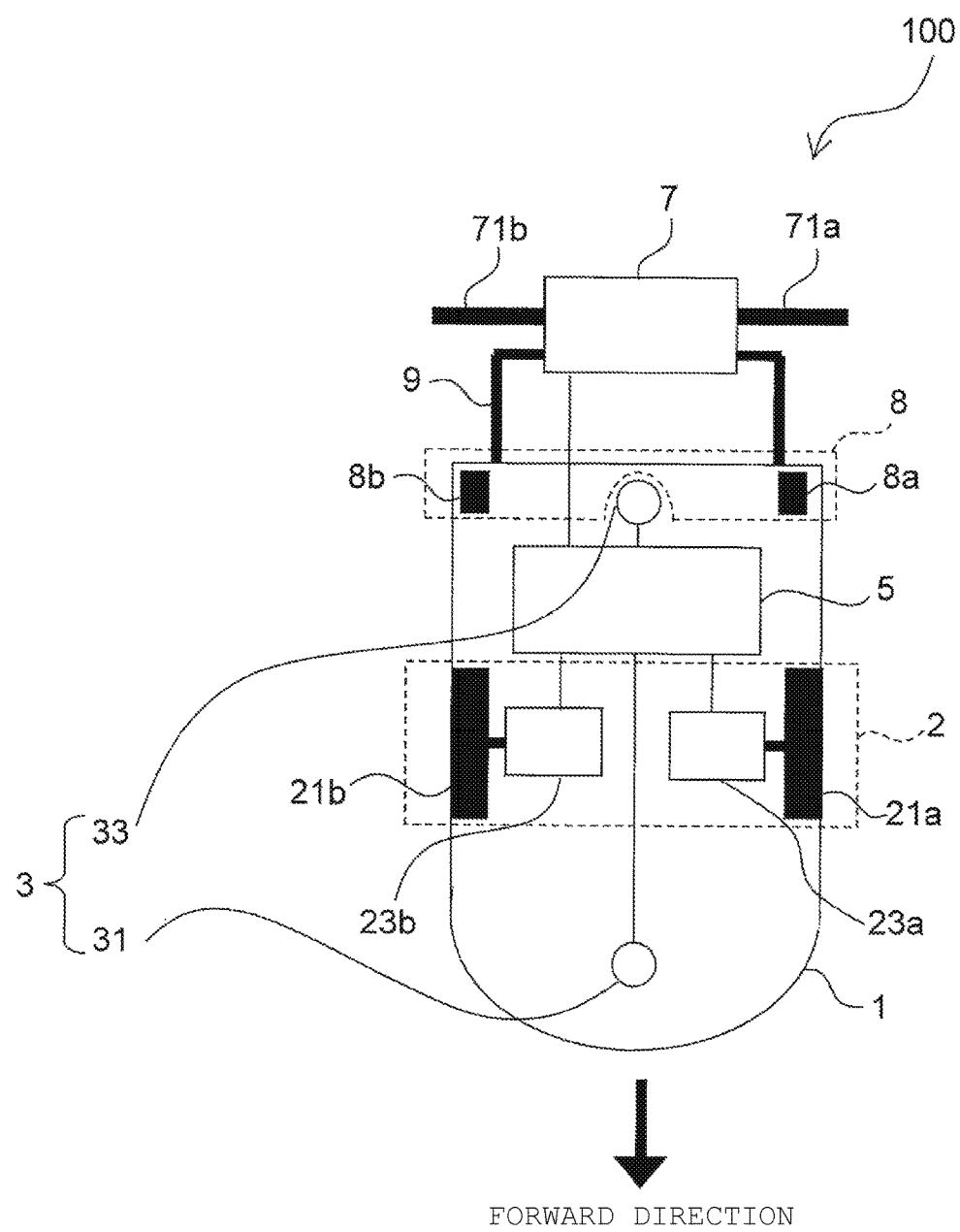
FIG. 1 is a diagram illustrating an entire configuration of an autonomous mobile body.

An autonomous mobile body according to a first preferred embodiment of the present invention is described below. The entire configuration of an autonomous mobile body 100 according to the first preferred embodiment is described with reference to FIG. 1. The autonomous mobile body 100 according to this preferred embodiment is a mobile body that autonomously travels along a desired travelling route that is predetermined according to this preferred embodiment.

The autonomous mobile body 100 includes a main body 1, a travelling unit 2, a position data obtaining unit 3, and a controller 5. The main body 1 defines the main body of the autonomous mobile body 100.

The travelling unit 2 includes, as illustrated in FIG. 1, wheels 21a and 21b and is installed near a center of a bottom of the main body 1 via motors 23a and 23b (described later) so that the wheels 21a and 21b contact with a travelling surface such as a floor surface of a moving region. Further, the wheels 21a and 21b are mounted to output rotary shafts of the motors 23a and 23b provided to right and left sides of the main body 1, respectively, so as to be rotatable around the output rotary shafts.

The motors 23a and 23b receive driving signals (described later) from the controller 5 and rotate the output rotary shafts based on the driving signals from the controller 5. The wheels 21a and 21b rotate in a rotating amount and/or at a rotating speed in response to the driving signals from the controller 5. The rotation of the wheels 21a and 21b enables the travelling unit 2 to move the main body 1 (namely, the autonomous mobile body 100). Electric motors such as brushless motors are used as the motors 23a and 23b.

Further, devices, not illustrated, that measure rotating amounts of the output rotary shafts of the motors 23a and 23b are mounted to the output rotary shafts of the motors 23a and 23b, respectively. The rotating amounts of the output rotary shafts measured by the devices are then output to the controller 5.

The controller 5 calculates rotating amounts of the wheels 21a and 21b based on the rotating amounts of the output rotary shafts of the motors 23a and 23b. Encoders or the like can be used as the devices that measure the rotating amounts of the output rotary shafts of the motors 23a and 23b. When the rotating amounts of the output rotary shafts are measured by, for example, incremental encoders, the rotating amounts of the output rotary shafts can be measured as pulse numbers per predetermined time included in pulse signals to be output from the encoders.

The position data obtaining unit 3 obtains a plurality of position data that form an image obtained by projecting an object such as an obstacle or a wall present around the autonomous mobile body 100 onto a predetermined coordinate (hereinafter, "a projection object image").

The plurality of position data that can form the projection object image can be obtained by using a laser range finder (LRF) or the like as the position data obtaining unit 3. A device such as a ToF (Time of Flight) camera that measures a distance from a main body of a certain object around the main body is also able to be used as the position data obtaining unit 3.

In this preferred embodiment, the laser range finder is preferably used as the position data obtaining unit 3, but the plurality of position data are preferably obtained as, for example, two-dimensional data including a distance from the autonomous mobile body 100 to a predetermined location of the object (for example, a portion of a surface of the object reflecting a signal output from the laser range finder) and an angle representing a direction from the autonomous mobile body 100 where the object is present.

The plurality of position data obtained from the position data obtaining unit 3 are obtained when a signal detector rotationally scans an output signal from the position data obtaining unit 3 reflected from the surface of the object and returned to the position data obtaining unit 3 within a predetermined angle range. Therefore, when the plurality of position data are plotted on a predetermined coordinate, (at least a portion of) a shape of the object (the surface) present around the autonomous mobile body 100 in the moving range is projected onto the predetermined coordinate. That is to say, the plurality of position data form the projection object image obtained by projecting the object present around the autonomous mobile body 100 onto the predetermined coordinate.

When an estimated moving amount of the autonomous mobile body 100 is estimated based on the plurality of position data, described later, the moving amount may be estimated by using position data having the obtained distance and angle as coordinate values. In this case, the predetermined coordinate becomes a coordinate including an axis representing the distance from the autonomous mobile body 100 to the object and an axis representing the angle from the autonomous mobile body 100 at which the object is present.

Further, the estimated moving amount of the autonomous mobile body 100 may be estimated by using new position data obtained by performing coordinate conversion on the obtained position data. For example, the obtained position data may be converted into position data on an X-Y coordinate in two dimensions, and position data on an X-Y-Z coordinate in three dimensions by the coordinate conversion.

In this preferred embodiment, the position data obtained in the position data obtaining unit 3 preferably is converted into position data as a coordinate value of the X-Y coordinate, and the estimated moving amount of the autonomous mobile body 100 is estimated.

Further, the position data to be obtained in the position data obtaining unit 3 is coordinate value data that is not influenced by a change in wheel diameters of the wheels 21a and 21b. In this preferred embodiment, therefore, the plurality of position data obtained in the position data obtaining unit 3 are used to calculate a moving amount that is closer to the actual moving amount of the autonomous mobile body 100 within the moving region.

As illustrated in FIG. 1, the position data obtaining unit 3 preferably includes a forward data obtaining unit 31 and a backward data obtaining unit 33, each of which is preferably defined by one of the hardware devices (LRF or ToF camera) defining the position data obtaining unit 3. The forward data obtaining unit 31 is mounted to a front portion of the autonomous mobile body 100, and obtains position data of an object present in front of the autonomous mobile body 100. On the other hand, the backward data obtaining unit 33 is mounted to a back portion of the autonomous mobile body 100 in an advancing direction, and obtains position data from an object present at the back of the autonomous mobile body 100.

In this preferred embodiment, a position data obtainable range of the forward data obtaining unit 31 is wider than position data obtainable range of the backward data obtaining unit 33. In this preferred embodiment, for example, the backward data obtaining unit 33 is able to detect an object present within an about 180° range of the back of the autonomous mobile body 100 within an about 10 m radius from a center of the backward data obtaining unit 33, whereas the forward data obtaining unit 31 is able to detect an object present within an about 270° range of the front of the autonomous mobile body 100 within an about 30 m radius from a center of the forward data obtaining unit 31.

As a result, the position data obtaining unit 3 is able to detect an object present within a wider range from the center of the autonomous mobile body 100 (particularly, in front of the autonomous mobile body 100). An object detecting range of the forward data obtaining unit 31 and an object detecting range of the backward data obtaining unit 33 are not limited to the above detecting ranges, and suitable ranges can be set as needed or desired.

In this preferred embodiment, the forward data obtaining unit 31 and/or the backward data obtaining unit 33 are mounted above (the front and the back of) the main body 1 in a vertical direction. As a result, for example, when an object placed on a floor surface as the moving region frequently moves (a layout of shelves and a signboard is frequently changed in a broadline retailer), a temporal change in the projection object image to be formed by the plurality of position data obtained by the forward data obtaining unit 31 and the backward data obtaining unit 33 (particularly, a change such that an object preset at a certain time is not present at another time) is able to be reduced.

In a conventional technique, when an object placed on the moving region is frequently moved, a projection object image to be formed by the plurality of position data obtained before the autonomous mobile body 100 moves is greatly different from a projection object image to be formed by the plurality of position data obtained after the movement in some cases. When the projection object images are different before and after the movement, it is difficult to match one of the projection object images before and after the movement with the other one of the projection object images, even if one of the projection object images before and after the movement is moved in any way. In this case, it is difficult to estimate the moving amount of the autonomous mobile body 100 using the plurality of position data.

In the conventional technique, when the projection object images before and after the movement of autonomous mobile body 100 are greatly different from each other and the determination is made that the moved projection object image matches with the projection object image as a reference, the moving amount, to be estimated from the moving amount of the moved projection object image, of the autonomous mobile body 100 is greatly different from the actual moving amount of the autonomous mobile body 100. That is to say, a great error is occasionally caused between the moving amount, which is estimated based on the plurality of position data, of the autonomous mobile body 100 and the actual moving amount of the autonomous mobile body 100.

In order to solve these problems, in this preferred embodiment, the forward data obtaining unit 31 and/or the backward data obtaining unit 33 are provided above the main body 1 (for example, a position exceeding a height of a person's head or store shelves), so that a probability of detecting an object to be frequently moved is reduced. As a result, the moving amount of the autonomous mobile body 100 is estimated accurately by using the plurality of position data obtained by the forward data obtaining unit 31 and the backward data obtaining unit 33 (the position data obtaining unit 3) without causing a great error.

The controller 5 controls the travelling unit 2. Specifically, the controller 5 estimates a current position of the autonomous mobile body 100 based on the moving amount of the autonomous mobile body 100 calculated based on the plurality of position data obtained by the position data obtaining unit 3. Further, the controller 5 estimates the current position of the autonomous mobile body 100 based on the estimated moving amount and the current position.

The controller 5 generates a control signal to move the autonomous mobile body 100 to a predetermined target position (or one of a plurality of target positions) stored in a storage unit (described later) of the controller 5 from the estimated current position, and generates a driving signal to drive the travelling unit 2 based on the control signal, to output the driving signal to (the motors 23a and 23b) of the travelling unit 2.

The detailed configuration of the controller 5 and the method to calculate the moving amount of the autonomous mobile body 100 in the controller 5 are described later.

The above-described configuration of the autonomous mobile body 100 enables the autonomous mobile body 100 to estimate a position in the moving region where the main body is present using the plurality of position data obtained by the position data obtaining unit 3. Further, a control signal to move the autonomous mobile body 100 to a predetermined target position is calculated inside the autonomous mobile body 100 (the controller 5) based on the estimated (current) position of the autonomous mobile body 100. As a result, the autonomous mobile body 100 autonomously moves along a predetermined travelling route.

As illustrated in FIG. 1, the autonomous mobile body 100 according to the first preferred embodiment further includes an operation unit 7 mounted to the main body 1 by using a mounting member 9. As illustrated in FIG. 1, the operation unit 7 includes turnable operation handles 71a and 71b, and operating amounts (turning amounts) of the operation handles 71a and 71b are output to the controller 5. As a result, the controller 5 generates driving signals to control the motors 23a and 23b in accordance with the operating amounts of the operation handles 71a and 71b.

Provision of the operation unit 7 to the autonomous mobile body 100 enables an operator to operate the autonomous mobile body 100. Specifically, the operator turns the operation handles 71a and 71b and adjusts the turning amounts and the rotating speeds of the wheels 21a and 21b, so as to be capable of operating the autonomous mobile body 100.

Further, the controller 5 is able to estimate a position of the main body of the autonomous mobile body 100 in the moving region. For this reason, when the operator operates the autonomous mobile body 100 using the operation unit 7, the position of the autonomous mobile body 100 is estimated at predetermined time intervals, and the estimated position is stored in a storage unit 51 or the like. As a result, the operation of the autonomous mobile body 100 performed by the operator is taught as the predetermined travelling route to the autonomous mobile body 100 (the controller 5).

A method for teaching the travelling route to the autonomous mobile body 100 is not limited to a method of estimating and storing the position of the autonomous mobile body 100 while the operator is operating the autonomous mobile body 100 using the operation unit 7. For example, the travelling route can be taught to the autonomous mobile body 100 also by directly operating (or directly inputting) a coordinate value of a coordinate point on data where the coordinate point representing the travelling route is stored. Alternatively, the travelling route can be taught to the autonomous mobile body 100 by another method that specifies a position of the autonomous mobile body 100 in the moving range.

Further, the autonomous mobile body 100 of the first preferred embodiment further includes a safety wheel unit 8. The safety wheel unit 8 includes two safety wheels 8a and 8b. The two safety wheels 8a and 8b are mounted to backward bottom of the main body 1 so as to be independently rotatable. The provision of the safety wheel unit 8 enables the autonomous mobile body 100 to move safely and smoothly.

Figure 2:
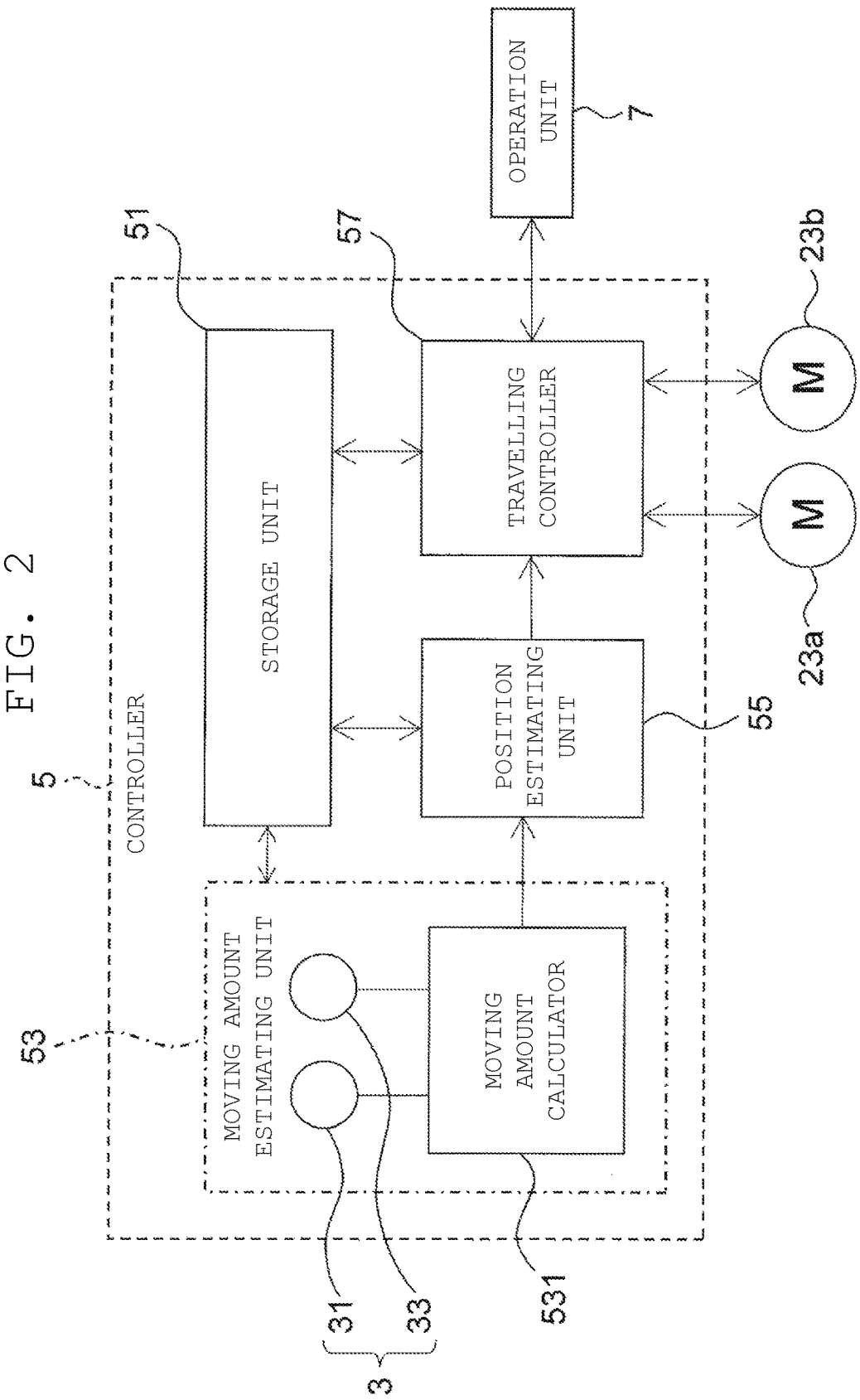
FIG. 2 is a diagram illustrating a configuration of a controller.

The entire configuration of the controller 5 is described below with reference to FIG. 2. The controller 5 preferably is defined by a microcomputer system that includes a CPU (Central Processing Unit), a hard disc device, a ROM (Read Only Memory), a RAM (Random Access Memory), a storage device including a storage medium reading device, and an interface that converts a signal. Further, some of or all of functions of the respective units of the controller 5 to be described below may be realized as programs. The programs may be stored in a storage device of a microcomputer. Alternatively, some of or all of the functions of the respective units of the controller 5 may be realized by a custom IC or other circuitry, or the like.

Further, the controller 5 may be constituted by a plurality of microcomputer systems. For example, a moving amount estimating unit 53 (one example of a moving amount estimating apparatus), described later, a travelling controller 57, and other components of the controller 5 may be constituted by individual microcomputer systems.

The controller 5 includes the storage unit 51, the moving amount estimating unit 53, a position estimating unit 55, and the travelling controller 57. The storage unit 51 corresponds to at least a portion of the storage region of the storage device of the controller 5. The storage unit 51 stores information necessary for autonomous movement of the autonomous mobile body 100 in the moving region. Data representing the coordinate values representing the travelling route (occasionally referred to as a travelling schedule), map information representing the moving region (occasionally referred to as a global map or an environmental map) and the like are stored in the storage unit 51. In addition, the storage unit 51 stores various setting values necessary for the operation of the autonomous mobile body 100.

The moving amount estimating unit 53 estimates a moving distance of the autonomous mobile body 100. For this reason, the moving amount estimating unit 53 includes a moving amount calculator 531. The moving amount calculator 531 calculates a distance along which the autonomous mobile body 100 moves, based on the plurality of position data obtained by the position data obtaining unit 3.

Any of the plurality of position data obtained before and after the movement is moved, and the moving amount calculator 531 calculates the moving amount of the autonomous mobile body 100 (the estimated moving amount) based on whether the moved position data matches with the other position data different from the moved position data.

In the moving amount calculator 531, an evaluation is made whether a moving amount of position data to be moved from original position data (a data moving amount) is adequate, and when the data moving amount exceeds a maximum travelling ability (a maximum travelling amount) of the travelling unit 2, the determination is made that the data moving amount is inadequate.

The detailed configuration of the moving amount calculator 531 and the moving amount calculating method are described in detail below.

The position estimating unit 55 estimates a present position of the autonomous mobile body 100 in the moving region. In this preferred embodiment, the position estimating unit 55 estimates a current position of the autonomous mobile body 100 using a SLAM (Simultaneous Localization and Mapping) method based on a map matching result of map information representing a position of an object such as a wall or an obstacle around the autonomous mobile body 100 in the current position (local map), and map information representing (an entire portion of or a portion including at least the region where the autonomous mobile body 100 moves of) the moving region stored in advance (a global map, an environmental map).

Specifically, the position estimating unit 55 generates a plurality of "temporary current positions" calculated by adding a predetermined error to the moving amount estimated by the moving amount estimating unit 53. The temporary current positions preferably are calculated by, for example, adding the moving amount to which the error is added to the position of the autonomous mobile body 100 estimated before the movement.

The local map is generated by using the plurality of position data obtained in the temporary current position by using the position data obtaining unit 3 for each of the temporary current positions. Thereafter, the position estimating unit 55 estimates a temporary current position where the local map that matches the most with the environmental map is generated in the plurality of generated local maps as the actual current position of the autonomous mobile body 100. In such a manner, the position estimating unit 55 estimates the current position of the autonomous mobile body 100 based on the moving amount estimated by the moving amount estimating unit 53.

Further, when the operator operates the autonomous mobile body 100 using the operation unit 7, the position estimating unit 55 may estimate the position of the autonomous mobile body 100 at predetermined time intervals (for example, per control cycle) using the above method and store information about the estimated positions (coordinate values or the like) in the storage unit 51. Accordingly, the position estimating unit 55 is able to store the moving operation of the autonomous mobile body 100 to be performed by the operator in the storage unit 51. As a result, the autonomous mobile body 100 autonomously moves using the stored moving operation to be performed by the operator so that the moving operation by the operator is repeated autonomously.

The position estimating unit 55 may update the environmental map to be stored in the storage unit 51 using the local map generated in the current position. As a result, even when the position of an obstacle or the like is changed in the moving region, a new environmental map after the position of the obstacle is changed is able to be created to be stored.

When the autonomous mobile body 100 autonomously moves, the travelling controller 57 controls the travelling unit 2 so that the autonomous mobile body 100 travels from the current position to a predetermined target position included in the moving route predetermined and stored in the storage unit 51.

Specifically, the travelling controller 57 generates a control command to move the autonomous mobile body 100 at a predetermined speed and/or an acceleration speed from the current position to the predetermined target position based on the distance and a direction between the current position and the predetermined target position. The travelling controller 57 calculates driving signals to control the motors 23*a* and 23*b* based on the control command, and outputs the respective driving signals to the motors 23*a* and 23*b*.

The travelling controller 57 outputs the driving signals individually to the motors 23*a* and 23*b*. That is to say, the motors 23*a* and 23*b* are able to rotate at different rotating speeds. For example, when the autonomous mobile body 100 is desired to be moved straight, the motors 23*a* and 23*b* are rotated at the same rotating speeds. On the other hand, when the motors 23*a* and 23*b* are rotated at different rotating speeds, the autonomous mobile body 100 makes rotary motions (a right turn and a left turn).

A travelling unit, in which the two wheels 21*a* and 21*b* are individually rotated to travel by the motors 23*a* and 23*b* like the travelling unit 2 illustrated in FIG. 1, is referred to also as a "differential two-wheel" travelling unit.

Further, the travelling controller 57 can input turning amounts (operating amounts) of the operation handles 71*a* and 71*b* from the operation unit 7, and calculate the driving signals based on the input turning amounts so as to output the respective driving signals to the motors 23*a* and 23*b*. As a result, the autonomous mobile body 100 is able to be operated by the operator who operates the operation handles 71*a* and 71*b*.

A controller or the like using a feedback control theory is able to be used as the travelling controller 57. When the controller configured or programmed to use the feedback control theory is used as the travelling controller 57, the travelling controller 57 inputs pulse signals from the encoders mounted to the output rotary shafts of the motors 23*a* and 23*b* and controls the rotating amounts of the motors 23*a* and 23*b* in accordance with a control command.

When the controller 5 has the above-described configuration, the autonomous mobile body 100 is able to autonomously move along the predetermined travelling route such as the travelling route stored in the storage unit 51.

The entire configuration of the moving amount calculator 531 according to the first preferred embodiment is described below with reference to FIG. 3. FIG. 3 is a diagram illustrating an entire configuration of the moving amount calculator. The moving amount calculator 531 is configured or programmed to include a position data storage unit 5311, an estimating unit 5312, and an evaluating unit 5313.

The position data storage unit 5311 is a portion of the storage region of the storage device in the microcomputer system of the controller 5 or the storage region of the storage unit 51. The position data storage unit 5311 stores the plurality of position data obtained from the position data obtaining unit 3 (obtained by coordinate conversion) before and after the autonomous mobile body 100 moves. In this preferred embodiment, first position data to be referenced is the position data obtained before the autonomous mobile body 100 moves, and the second position data to be moved is the position data obtained after the autonomous mobile body 100 moves.

On the contrary, the position data obtained before the autonomous mobile body 100 moves may be the second position data, and the position data obtained after the movement may be the first position data.

The estimating unit 5312 estimates the moving amount of the autonomous mobile body 100 using a plurality of first position data and a plurality of second position data stored in the position data storage unit 5311. The estimating unit 5312 estimates, as the moving amount of the autonomous mobile body 100, the moving amount of the parallel movement and/or the moving amount of the rotational movement with respect to the plurality of second position data when the plurality of moving position data, which is obtained when the first projection object image formed by the plurality of first position data matches with the moving projection object image, is calculated. The moving projection object image is formed by the plurality of moving position data obtained by the parallel movement and/or the rotational movement of the plurality of second position data on a predetermined coordinate. The moving amount of the autonomous mobile body 100 estimated by the estimating unit 5312 is referred to as the estimated moving amount.

The evaluating unit 5313 evaluates the moving amount of a plurality of moving position data with respect to the second position data (the data moving amount), which is obtained by moving the plurality of second position data so as to calculate the plurality of moving position data when the estimated moving amount is estimated based on the maximum travelling amount at which the autonomous mobile body 100 is allowed to travel during a predetermined period by the travelling unit 2.

The evaluating unit 5313 evaluates, as the maximum travelling amount, a product of a maximum translation speed and/or a maximum rotation speed of the autonomous mobile body 100 that is enabled to travel by the rotation of the wheels 21*a* and 21*b* of the travelling unit 2 and a predetermined period before and after the autonomous mobile body 100 moves. As a result, the maximum travelling amount is able to be calculated more simply. Since the maximum translation speed and/or the maximum rotation speed are fixed values that are able to be determined by specifications of the travelling unit 2, the maximum translation speed and/or the maximum rotation speed are stored in the storage unit 51 in advance.

Further, when the evaluating unit 5313 evaluates that the data moving amount is the maximum travelling amount or less and is an adequate moving amount, the data moving amount is adopted as the moving amount in which the autonomous mobile body 100 moves. The evaluating unit 5313 further evaluates the estimated moving amount estimated by the estimating unit 5312 as the data moving amount.

Specifically, the evaluating unit 5313 evaluates the estimated moving amount by using any one of (i) a method for evaluating the estimated moving amount calculated at every estimation of the estimated moving amount (the data moving amount) and adopting only the estimated moving amount that is the maximum travelling amount or less, and (ii) a method for storing a plurality of estimated moving amounts and selecting an adequate estimated moving amount that is the maximum travelling amount or less from the plurality of estimated moving amounts as the moving amount of the autonomous mobile body 100. As a result, the evaluating unit 5313 discards the estimated moving amount evaluated as being inadequate, but can adopt the estimated moving amount evaluated as being adequate as the moving amount of the autonomous mobile body 100.

The evaluating unit 5313 may adopt the adequate estimated moving amount using both the methods to evaluate the estimated moving amount described in (i) and (ii), or may select any one of the evaluating methods (i) and (ii) depending on a predetermined condition.

The above configuration of the moving amount calculator 531 enables the evaluation whether the data moving amount at the time of moving the plurality of second position data and calculating the plurality of moving position data is a reasonable moving amount in comparison with the maximum travelling amount in which the autonomous mobile body 100 can travel using the travelling unit 2. Only the reasonable (evaluated as being adequate) data moving amount and/or estimated moving amount may be adopted as the moving amount of the autonomous mobile body 100. As a result, the calculation of the inadequate data moving amount and/or estimated moving amount that are larger than the maximum travelling amount is/are avoided.

The configuration of the estimating unit 5312 is described in detail below with reference to FIG. 3. As illustrated in FIG. 3, the estimating unit 5312 is configured or programmed to include a position data moving unit 5312-1, a distance calculating unit 5312-2, and a first estimating unit 5312-3.

The position data moving unit 5312-1 allows a parallel movement and/or a rotational movement of the plurality of second position data on a predetermined coordinate so as to calculate moving position data. The parallel movement of the plurality of position data on the predetermined coordinate is able to be performed by adding a moving amount of the translation movement to the coordinate values of the plurality of position data. On the other hand, the rotational movement of the plurality of position data on the predetermined coordinate is able to be performed by calculating coordinate values of the position data after the rotational movement in accordance with a publicly-known formula representing the coordinate rotation, for example. The moving amount of the parallel movement and/or the moving amount of the rotational movement of the second position data (and the moving position data) are determined by the first estimating unit 5312-3 (described later).

The distance calculating unit 5312-2 calculates a distance between the two projection object images to be formed on the predetermined coordinate by two kinds of the plurality of position data. In this preferred embodiment, the distance calculating unit 5312-2 calculates, as the distance between data, a distance between one of the plurality of first position data, one of the plurality of moving position data corresponding to the one first position data, and a plane defined by moving position data around that one moving position data, and defines a total distance obtained by adding a predetermined number of the distances between data as a distance between the first projection object image to be formed by the plurality of first position data and the moving projection object image to be formed by the plurality of moving position data.

When the distance between data is calculated, the distance calculating unit 5312-2 may calculate a distance between one first position data and one moving position data corresponding this one first position data as one distance between data. Alternatively, the distance calculating unit 5312-2 may calculate distances between one first position data and a plurality of moving position data that are included in the plurality of moving position data and are present comparatively near that one first position data as the plurality of distances between data.

When the plurality of distances between data are calculated for one first position data, the distance calculating unit 5312-2 does not have to use some of the plurality of calculated distances between data that exceed a predetermined distance. When a plane distance that is the predetermined distance or more is not used, the distance between data is not calculated at all for one first position data, the plurality of distances between data are calculated for one moving position data, or one distance between data is calculated for one first position data in some cases.

As the distance between data, various distances representing a distance between coordinate spaces can be used. For example, Euclidean distance and Manhattan distance (a distance obtained by summing up differences between respective coordinate values of two coordinate points) can be used as the distance between position data.

The distance calculating unit 5312-2 may calculate a distance between one first position data and the projection object image to be formed by the plurality of moving position data as the distance between data. The distance between one first position data and the projection object image to be formed by the plurality of moving position data can be calculated as, for example, a distance between one first position data and an intersection between the projection object image and a perpendicular line extended from that one first position data to the projection object image.

The first estimating unit 5312-3 compares a total distance of the distances between the first projection object image and the moving projection object image with a predetermined threshold. In this preferred embodiment, the first estimating unit 5312-3 determines whether the total distance is the predetermined threshold or less as the comparison between the total distance and the predetermined threshold.

When the total distance is the predetermined threshold or less, the first projection object image is sufficiently close to the moving projection object image. A state in which these two projection object images are sufficiently close to each other is a state in which the plurality of first position data approximately match with the plurality of moving position data in totally. Therefore, when the determination is made whether the distance between the two projection object images is the predetermined threshold or less, the first estimating unit 5312-3 is able to determine whether the plurality of first position data match with the plurality of moving position data.

When the determination is made that the plurality of first position data match with the plurality of moving position data, the first estimating unit 5312-3 estimates the estimated moving amount based on the moving amount of the parallel movement and/or the rotational movement of the plurality of moving position data determined as matching with the plurality of first position data with respect to the plurality of second position data (namely, the data moving amount of the second position data necessary to calculate final moving position data).

The operation of the autonomous mobile body 100 is described below. The moving amount estimating method in the moving amount estimating unit 53 (the moving amount calculator 531) according to the first preferred embodiment is described.

In the moving amount estimating method in the estimating unit 5312 according to the first preferred embodiment, when the projection object image (the moving projection object image) matches with the projection object image (the first projection object image), the moving amount of the second position data (the moving amount of the parallel movement and/or the moving amount of the rotational movement) in order to calculate the moving position data forming the moving projection object image is estimated as the moving amount before and after the movement of the autonomous mobile body 100. The projection object image (the moving projection object image) is formed by the parallel movement and/or the rotational movement of the projection object image (second projection object image). The projection object image (second projection object image) is formed by the plurality of position data (in this preferred embodiment, the second position data) obtained either before or after the autonomous mobile body 100 moves. The projection object image (the first projection object image) is formed by the plurality of position data (in this preferred embodiment, the first position data) obtained by the other of before and after the movement.

In the moving amount estimating method in the estimating unit 5312 according to the first preferred embodiment, the plurality of second position data or the plurality of moving position data are moved repeatedly by the predetermined method, and a search is made to determine how the plurality of second position data are moved when the plurality of moving position data are the closest to the plurality of first position data in totality.

Therefore, the moving amount estimating method in the estimating unit 5312 according to the first preferred embodiment is referred to as an ICP (Iterative Closest Point) method.

Figure 4A:
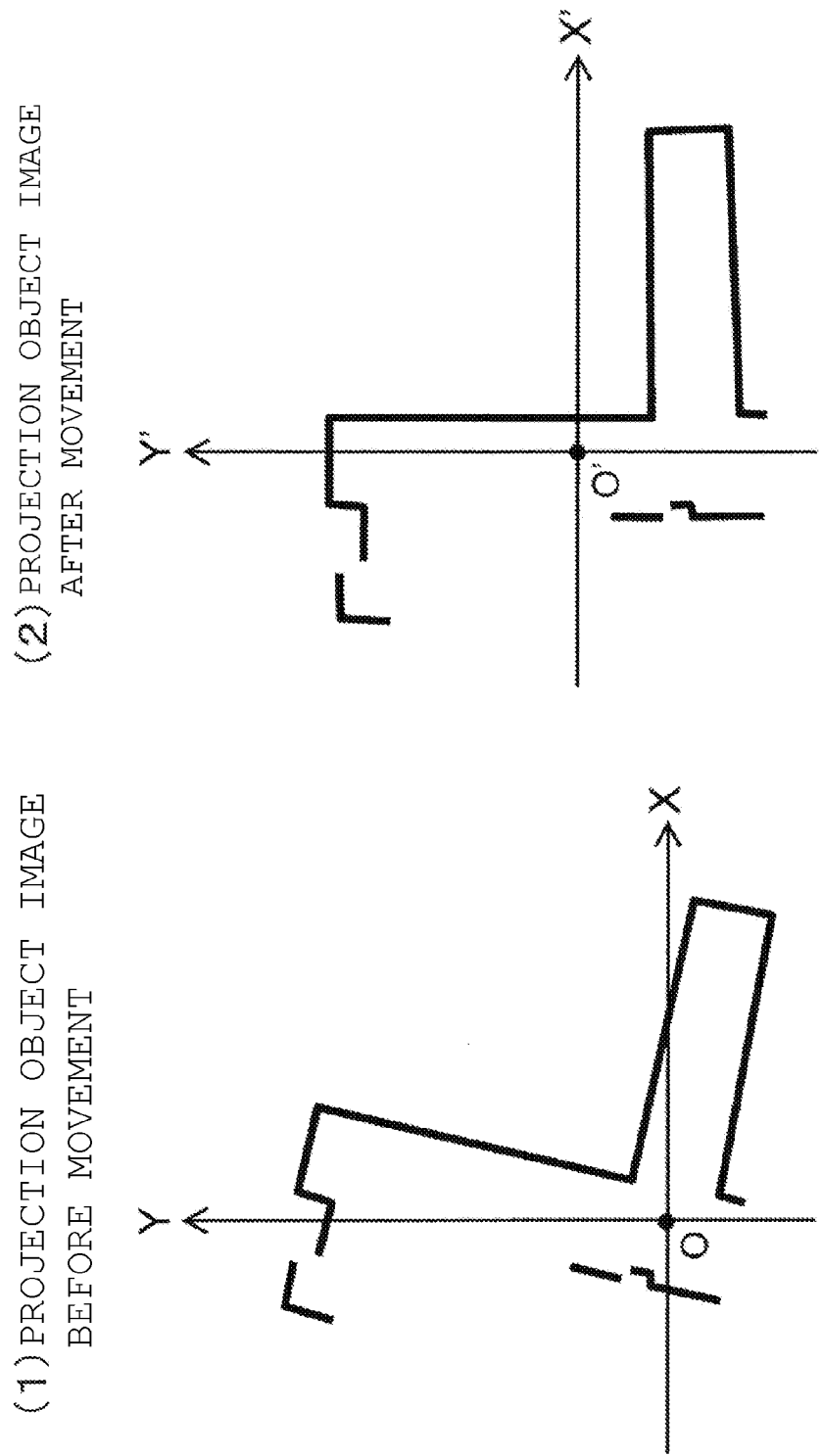
FIG. 4A is a diagram illustrating one example of a projection object image to be formed by position data obtained before and after a movement.

The moving amount estimating method according to the ICP method is schematically described with reference to FIG. 4A and FIG. 4B. FIG. 4A is a diagram illustrating one example of the projection object images to be formed by the position data obtained before and after the movement. FIG. 4B is a diagram schematically illustrating the moving amount estimating method according to the first preferred embodiment.

In the following description, the position data obtained before the movement is the first position data, and the position data obtained after the movement is the second position data. Therefore, the projection object image before the movement illustrated in (1) of FIG. 4A is the first projection object image to be formed by the plurality of first position data. On the other hand, the projection object image after the movement illustrated in (2) of FIG. 4A is the second projection object image to be formed by the plurality of second position data.

As illustrated in FIG. 4A and FIG. 4B, the position data to be obtained by the position data obtaining unit 3 is, for example, a coordinate value defined on a coordinate whose origin is a center position of the autonomous mobile body 100. In the following description, a coordinate defining the first position data is referred to as a first coordinate, and an origin of the first coordinate is a first origin O. Further, a coordinate defining the second position data (the moving position data) is referred to as a second coordinate, and an origin of the second coordinate is a second origin O'.

The first origin O and the second origin O' are not limited to the center position of the autonomous mobile body 100, and may be any reference points at which a relative position on the first coordinate from the center position of the autonomous mobile body 100, such as mounting position of the forward data obtaining unit 31 or the backward data obtaining unit 33, is the same as a relative position on the second coordinate from the center position of the autonomous mobile body 100.

When the plurality of first position data and the plurality of second position data are plotted on any one of the first coordinate and the second coordinate so that the first origin O matches with the second origin O', as illustrated in (1) of FIG. 4B, the first projection object image (solid line) and the second projection object image (dotted line) are formed on this one coordinate.

When the plurality of second position data are moved parallel in the state in which the two position data are plotted on one coordinate as illustrated in (1) of FIG. 4B, the second origin O' moves from the first origin O as illustrated in (2) of FIG. 4B. Further, when the plurality of second position data are rotationally moved about the second origin O', an X axis (an X' axis) and a Y axis (Y' axis) of the second coordinate tilt with respect to an X axis and a Y axis of the first coordinate.

In the moving amount estimating method in the estimating unit 5312 according to the first preferred embodiment, the second coordinate is typically and repeatedly moved parallel (the second origin O' is moved from the first origin O) so that the first projection object image matches with the moving projection object image as illustrated in FIG. 4B, and/or the second coordinate is typically and repeatedly rotated (moved) about the second origin O' so that the first projection object image matches with the moving projection object image. Thereafter, the estimating unit 5312 estimates a distance between the second origin O' and the first origin O at a time when the first projection object image matches with the moving projection object image, as the estimated moving amount in which the autonomous mobile body 100 moves parallel, and estimates an angle between respective axes of the second coordinate and corresponding axes of the first coordinate as the estimated moving amount (attitude angle changing amount) of the rotational movement of the autonomous mobile body.

In the ICP method, when the first projection object image matches with the moving projection object image, a determination is made that the plurality of first position data match with the plurality of moving position data in totality. As a result, in the ICP method, even when the first position data and/or the second position data obtained by the position data obtaining unit 3 include a noise, the estimated moving amount is estimated accurately.

The detail description is provided about the moving amount estimating method, when the methods (i) and (ii) are used as the method to evaluate the estimated moving amount and the data moving amount by the evaluating unit 5313.

Figure 5:
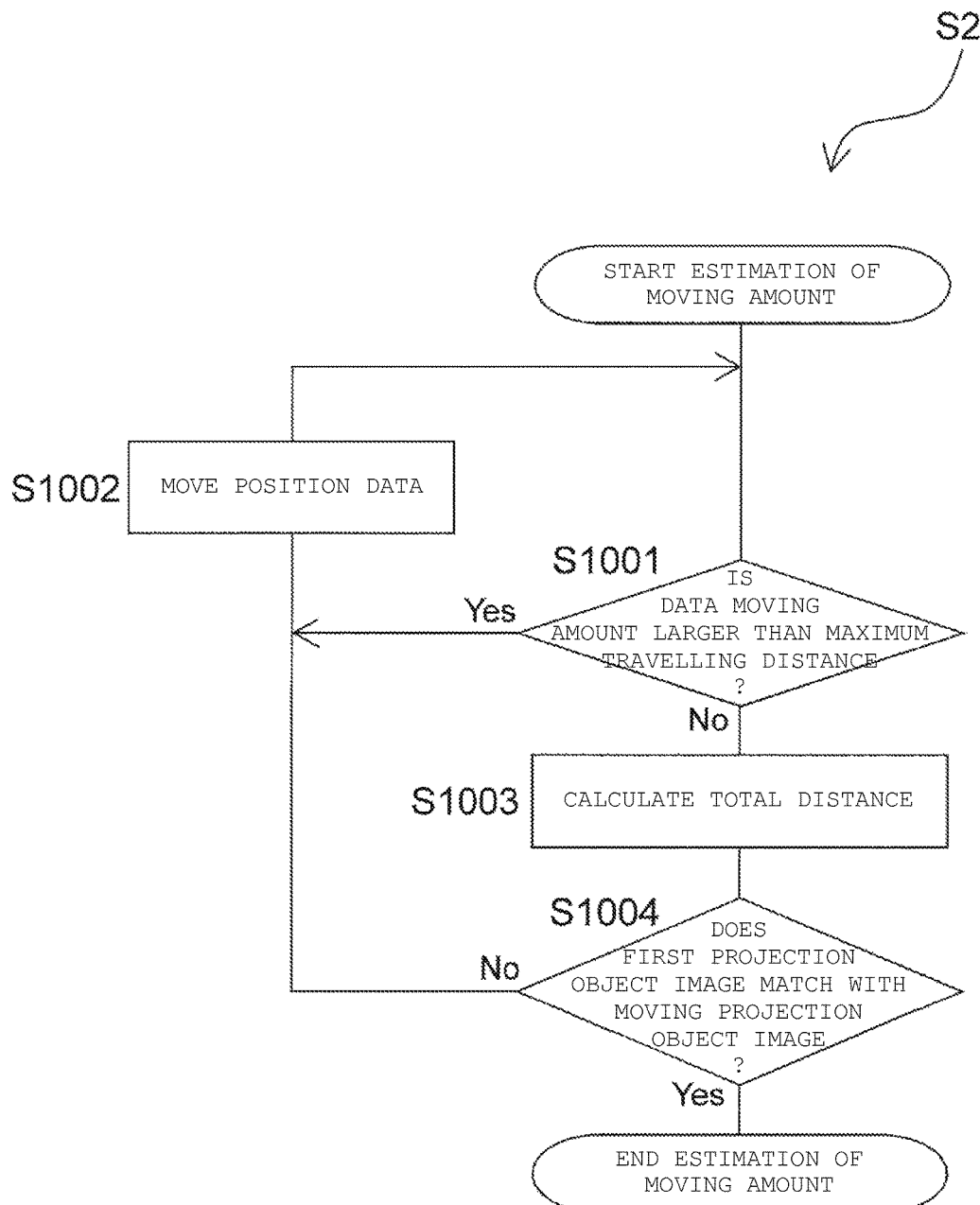
FIG. 5 is flowchart illustrating a method for evaluating a data moving amount every time when moving position data (second position data) is moved and estimating an estimated moving amount.

The method for evaluating the data moving amount every time when the moving position data (the second position data) is moved and estimating the estimated moving amount is described with reference to FIG. 5. FIG. 5 is a flowchart illustrating the method for evaluating the data moving amount every time when the moving position data (the second position data) is moved and estimating the estimated moving amount.

When the estimation of the estimated moving amount is started, the evaluating unit 5313 first determines whether the data moving amount at which the plurality of moving position data (or the second position data) are moved is larger than the maximum travelling amount (step S1001).

In the first estimation of the moving amount, since the second position data is not moved (namely, the data moving amount is 0), a process to estimate the estimated moving amount may proceed to step S1003, described later, without the determination at step S1001.

When the evaluating unit 5313 evaluates that the data moving amount at this time is larger than the maximum travelling amount ("Yes" at step S1001), namely, the data moving amount is evaluated as being inadequate, the evaluating unit 5313 instructs the position data moving unit 5312-1 to further move the previous moving position data (the second position data) (step S1002). That is to say, the evaluating unit 5313 discards the estimated moving amount at this time.

When the data moving amount is determined as being inadequate, the position data moving unit 5312-1 preferably calculates next moving position data using a data moving amount different from the data moving amount at which the moving position data at this time is moved from the second position data. This is because when next moving position data is calculated by using the previous data moving amount which is inadequate, an infinite loop of the process is likely to be generated in steps S1001 and S1002.

On the other hand, when the evaluating unit 5313 evaluates that the data moving amount at this time is the maximum travelling amount or less ("No" at step S1001), namely, that the data moving amount is adequate, the evaluating unit 5313 adopts the data moving amount as the adequate moving amount of the autonomous mobile body 100.

Thereafter, the process to estimate the estimated moving amount proceeds to a process to determine whether the moving position data at this time matches with the first position data. Specifically, at the process to estimate the estimated moving amount, the distance calculating unit 5312-2 calculates a distance between the first projection object image to be formed by the plurality of first position data and the moving projection object image to be formed by the plurality of moving position data at this time (total distance) (step S1003).

After the calculation of the total distance, the first estimating unit 5312-3 compares the total distance calculated this time with a predetermined threshold, and determines whether the first projection object image matches with the moving projection object image at this time (step S1004).

When the determination is made that the total distance is the predetermined threshold or less, namely, that the first projection object image matches with the moving projection object image at this time ("Yes" at step S1004), the first estimating unit 5312-3 estimates, as the estimated moving amount of the autonomous mobile body 100, the moving amount of the parallel movement and/or the rotational movement of the second position data until the moving position data at this time is calculated (the data moving amount) so as to end the process to estimate the moving amount.

On the other hand, when the determination is made that the first projection object image does not match with the moving projection object image at this time because the total distance is larger than the predetermined threshold ("No" at step S1004), the process to estimate the estimated moving amount is returned to step S1002. Specifically, the first estimating unit 5312-3 instructs the position data moving unit 5312-1 to calculate next moving position data.

The data moving amount of the next moving position data from the second position data after execution of step S1004 is able to be determined based on, for example, comparison between the total distance at this time calculated at step S1003 and the total distance calculated in the estimation of the estimated moving amount until the previous time.

Thereafter, steps S1001 to S1004 are repeated until the determination is made that the total distance is the predetermined threshold or less and the first projection object image matches with the moving projection object image.

When steps S1001 to 1004 are executed, the evaluation is made that the data moving amount is adequate at every estimation of the moving amount, and the estimated moving amount of the autonomous mobile body 100 is estimated by using only the adequate data moving amount. As a result, the estimated moving amount is able to be estimated with a reduced calculating amount and without estimating the estimated moving amount in an inadequate data moving amount.

Figure 6:
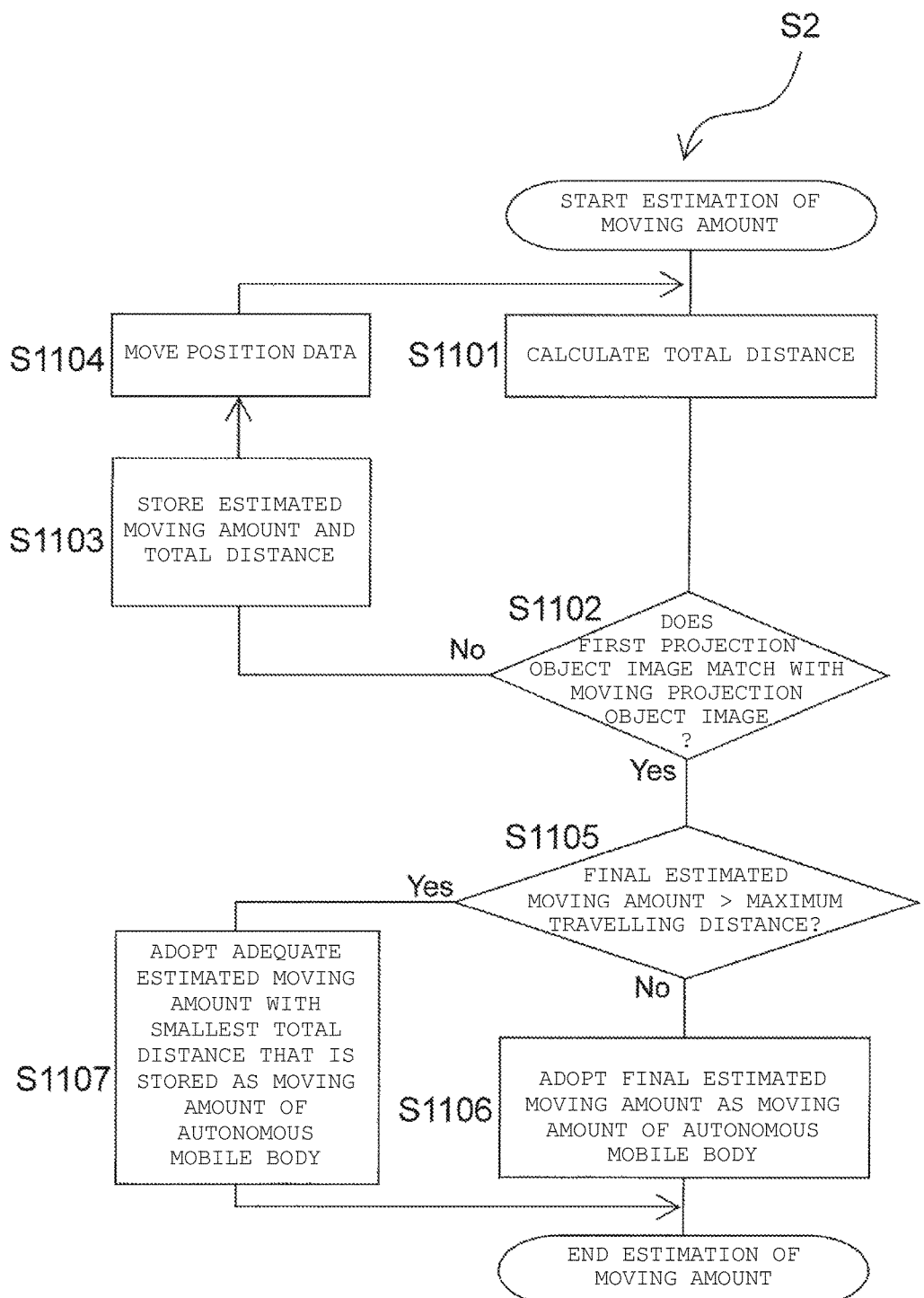
FIG. 6 is a flowchart illustrating a method to estimate the estimated moving amount when an adequate estimated moving amount is selected after estimation of a plurality of estimated moving amounts.

The moving amount estimating method when an adequate estimated moving amount is selected after the estimated moving amount is estimated by the ICP method is described below with reference to FIG. 6. FIG. 6 is a flowchart illustrating the estimated moving amount estimating method when an adequate estimated moving amount is selected after a plurality of estimated moving amounts are estimated.

When the estimation of the estimated moving amount is started, the distance calculating unit 5312-2 first calculates a distance between the first projection object image and the moving projection object image (or the second projection object image) to be formed by the plurality of moving position data at this time (or the plurality of second position data) (total distance) (step S1101). At step S1101, when the estimation of the estimated moving amount is a first estimation, the total distance may be or may not be calculated.

After the calculation of the total distance, the first estimating unit 5312-3 determines whether the first projection object image matches with the moving projection object image at this time based on comparison between the total distance and the predetermined threshold (step S1102).

When the determination is made that the first projection object image does not match with the moving projection object image at this time because the total distance is larger than the predetermined threshold ("No" at step S1102), the first estimating unit 5312-3 stores, in the storage unit 51, the estimated moving amount of the moving position data at this time from the second position data (the data moving amount) in connection with the total distance calculated at step S1101 (step S1103).

As a result, the estimated moving amount when the total distance is not the predetermined threshold or less can be stored in the storage unit 51 as a candidate of the estimated moving amount to be selectable at step S1107, described later.

The first estimating unit 5312-3 determines at step S1103 whether the estimated moving amount at this time is larger than the maximum travelling amount, and the estimated moving amount that is larger than the maximum travelling amount may not be stored in the storage unit 51. As a result, only an adequate estimated moving amount can be stored in the storage unit 51.

After the estimated moving amount at this time is stored, the first estimating unit 5312-3 instructs the position data moving unit 5312-1 to calculate the next moving position data (step S1104).

Thereafter, steps S1101 to S1104 are repeated until the total distance of the moving amount is the predetermined threshold or less and the determination is made that the first projection object image matches with the moving projection object image.

On the other hand, when the determination is made that the total distance is the predetermined threshold or less and that the first projection object image matches with the moving projection object image at this time ("Yes" at step S1102), the evaluating unit 5313 determines whether the final estimated moving amount of the moving position data at this time from the second position data is larger than the maximum travelling amount, so as to evaluate the final estimated moving amount (step S1105).

When the determination is made that the final estimated moving amount is the maximum travelling amount or less ("No" at step S1105), the evaluating unit 5313 evaluates that the final estimated moving amount is an adequate estimated moving amount, and adopts the final estimated moving amount as the moving amount in which the autonomous mobile body 100 moves during a predetermined period (step S1106). Thereafter, the process to estimate the moving amount is ended.

On the other hand, when the determination is made that the final estimated moving amount is larger than the maximum travelling amount ("Yes" at step S1105), the evaluating unit 5313 evaluates the final estimated moving amount as being inadequate, and discards the final estimated moving amount. The evaluating unit 5313 selects one from the candidates of the estimated moving amounts stored in the storage unit 51, and adopts the selected, estimated moving amount as the moving amount in which the autonomous mobile body 100 moves during the predetermined period (step S1107).

Specifically, the evaluating unit 5313 adopts the estimated moving amount with the shortest total distance in the estimated moving amounts stored in the storage unit 51 as the moving amount in which the autonomous mobile body 100 moves during the predetermined period. At this time, when all the estimated moving amounts calculated at step S1103 are stored in the storage unit 51 and the adopted, estimated moving amount is larger than the maximum travelling amount, the evaluating unit 5313 discards the adopted, estimated moving amount and adopts the estimated moving amount with the second shortest total distance (the estimated moving amount that is the maximum travelling amount or less) as the moving amount in which the autonomous mobile body 100 moves during the predetermined period. Thereafter, the process to estimate the estimated moving amount is ended.

By executing steps S1101 to S1107, when the final estimated moving amount is an "optimum solution" but is an inadequate estimated moving amount because it is larger than the maximum travelling amount, an adequate estimated moving amount can be a next "optimum solution" stored in the storage unit 51 to be adopted as the final estimated moving amount.

That is to say, even when the estimation of the estimated moving amount is determined to be a failure at last, the reasonable "next optimum solution" is found in past estimated results, thus avoiding a state in which the estimated moving amount cannot be estimated due to the failure in the estimation of the estimated moving amount of the autonomous mobile body 100.

Figure 7:
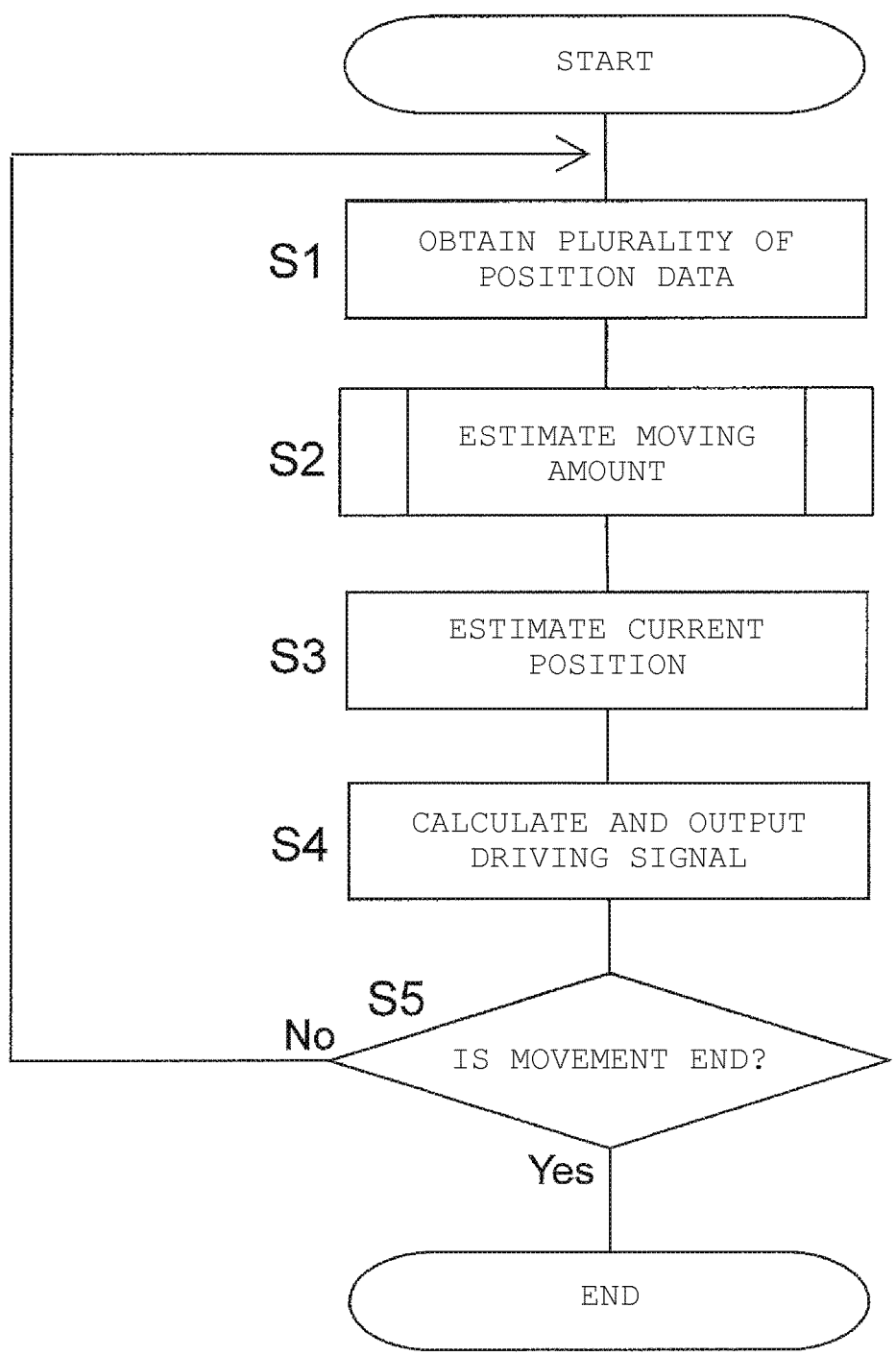
FIG. 7 is a flowchart illustrating an operation of the autonomous mobile body.

A specific operation of the autonomous mobile body 100 according to this preferred embodiment is described below with reference to FIG. 7. FIG. 7 is a flowchart illustrating the operation of the autonomous mobile body. The following description is provided about an operation when the autonomous mobile body 100 autonomously moves to a final target point while passing through a plurality of predetermined target points stored in the storage unit 51.

When the autonomous movement of the autonomous mobile body 100 starts, the position data obtaining unit 3 obtains the plurality of position data before and after the autonomous mobile body 100 moves (step S1). The plurality of obtained position data (the first position data and the second position data) are stored in the position data storage unit 5311.

After the plurality of first position data and the plurality of second position data are obtained, steps S1001 to S1004 illustrated in FIG. 5 and/or steps S1101 to S1107 illustrated in FIG. 6 are executed, so that the moving amount of the autonomous mobile body 100 is estimated (step S2).

After the moving amount of the autonomous mobile body 100 is estimated, the position estimating unit 55 inputs the estimated moving amount estimated by the moving amount estimating unit 53 at step S2, and estimates the current position of the autonomous mobile body 100 based on the input estimated moving amount using the method to estimate the position of the autonomous mobile body 100 according to the above-described matching (step S3).

After the current position of the autonomous mobile body 100 is estimated, the travelling controller 57 calculates a driving signal to move the autonomous mobile body 100 from a current position to a next target position, and outputs the driving signal to the motors 23a and 23b of the travelling unit 2 (step S4).

Specifically, the travelling controller 57 inputs the current position of the autonomous mobile body 100 estimated by the position estimating unit 55 at step S3. Further, the travelling controller 57 reads the next target position from the storage unit 51 based on the input current position. Thereafter, the travelling controller 57 calculates a control command to move the autonomous mobile body 100 to the read next target position from the current position of the autonomous mobile body 100.

The control command to be calculated by the travelling controller 57 is calculated as data representing, for example, a relationship between a time during a movement from a current position to a next target position and the speed of the autonomous mobile body 100 (rotational speeds of the wheels 21a and 21b, namely, rotational speeds of the motors 23a and 23b).

After the calculation of the control command, the travelling controller 57 generates a driving signal to drive (control) the motors 23a and 23b based on the calculated control command, and outputs the calculated driving signals to the motors 23a and 23b of the travelling unit 2.

After the driving signals are output to the travelling unit 2, the controller 5 determines whether, for example, the autonomous mobile body 100 passes through all the target positions stored in the storage unit 51, so as to determine whether the autonomous movement is ended (step S5).

For example, when the determination is made that the autonomous mobile body 100 does not pass through all the target position and the autonomous movement is continued ("No" at step S5), the autonomous moving process returns to step 51 so that the autonomous movement is continued.

On the other hand, when the determination is made that the autonomous mobile body 100 has passed through all the target positions and the autonomous movement is ended ("Yes" at step S5), the autonomous moving process is ended.

In the moving amount estimating unit 53 according to the first preferred embodiment, the estimated moving amount of the autonomous mobile body 100 estimated by using the ICP method is evaluated based on the maximum travelling amount in which the autonomous mobile body 100 is enabled to travel by the travelling unit 2. In the first preferred embodiment, when the estimated moving amount is larger than the maximum travelling amount, the evaluating unit 5313 evaluates the estimated moving amount as being inadequate, and thus discards the estimated moving amount. On the other hand, when the estimated moving amount is the maximum travelling amount or less, the estimated moving amount is evaluated as being adequate, and the estimated moving amount is adopted as the moving amount of the autonomous mobile body 100.

As a result, when the estimated moving amount is unreasonable (inadequate) in view of the travelling performance of the travelling unit 2, the inadequate estimated moving amount is not adopted as the moving amount of the autonomous mobile body 100 (namely, the inadequate estimated moving amount is discarded). On the other hand, when the estimated moving amount is reasonable (adequate) in view of the travelling performance, the estimated moving amount is adopted as the estimated moving amount of the autonomous mobile body 100. As a result, the estimated moving amount is prevented from being inadequate when the inadequate estimated moving amount is mis-estimated as the estimated moving amount of the autonomous mobile body 100 during the predetermined period. Further, when all the estimated moving amounts are discarded as being inadequate, namely, the estimation of the estimated moving amount fails and the estimated moving amount cannot be estimated, the maximum travelling amount may be adopted as the estimated moving amount of the autonomous mobile body 100. As a result, a state in which the estimated moving amount becomes unclear (indeterminate) can be avoided.

Second Preferred Embodiment

In the first preferred embodiment, the evaluating unit 5313 preferably evaluates a product of a maximum speed of an autonomous mobile body 100 and a predetermined period as a maximum travelling amount. A method to determine the above maximum travelling amount is not, however, limited to this. In a second preferred embodiment of the present invention, the maximum travelling amount is determined based on control signals that control the wheels 21a and 21b (motors 23a and 23b).

The autonomous mobile body 100 according to the second preferred embodiment is similar to the autonomous mobile body 100 according to the first preferred embodiment except that the moving amount calculator 531 of the moving amount estimating unit 53 is configured or programmed to include a control moving amount estimating unit 5314 (described later) to calculate a maximum travelling amount based on the control signal from the travelling controller 57. Therefore, only a configuration of a moving amount calculator 531' according to the second preferred embodiment is described below with reference to FIG. 8A, and description about the other configuration and an estimating method is omitted.

Figure 8A:
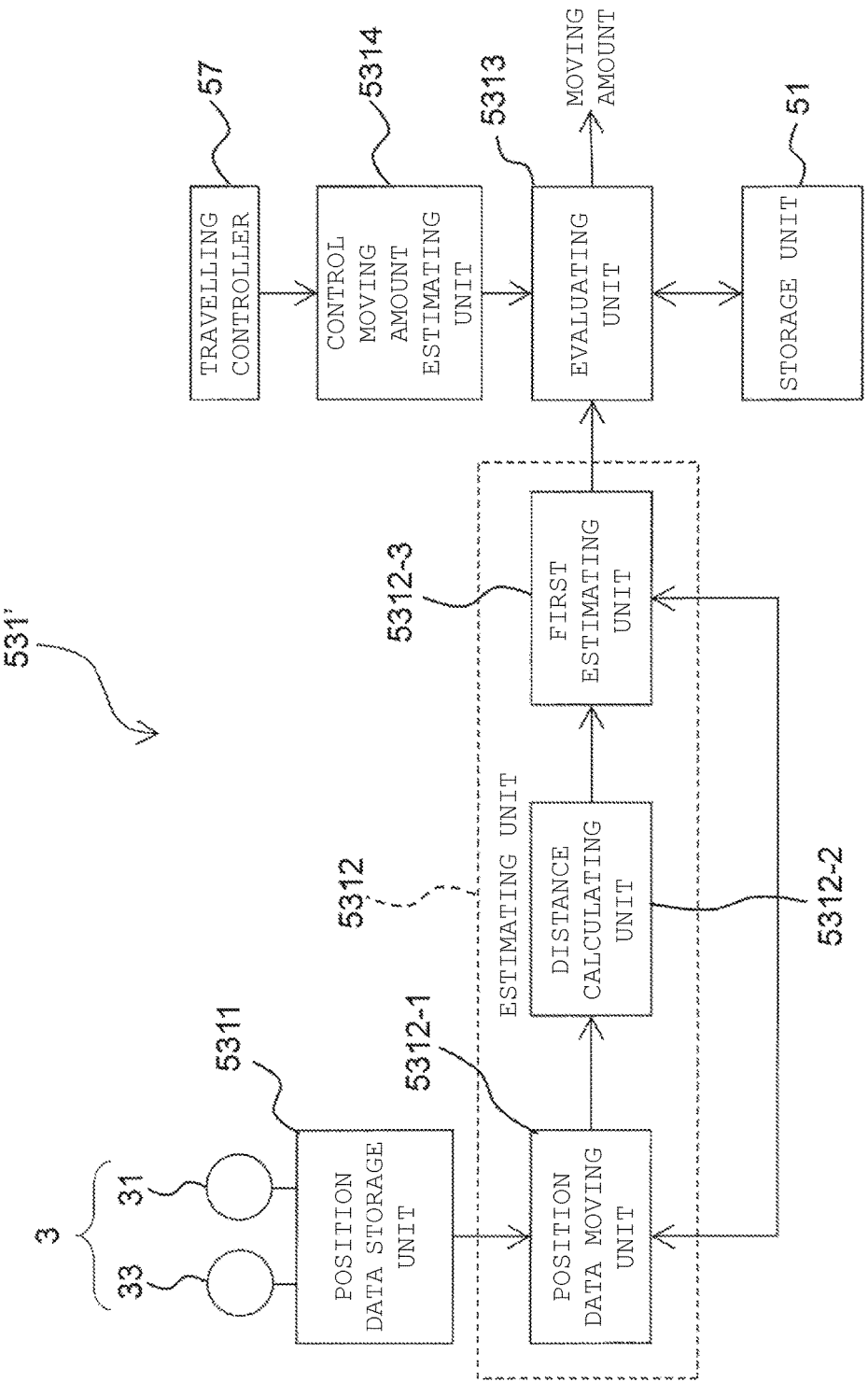
FIG. 8A is a diagram illustrating a configuration of the moving amount calculator according to a second preferred embodiment of the present invention.

As illustrated in FIG. 8A, the moving amount calculator 531' according to the second preferred embodiment is configured or programmed to include a position data storage unit 5311, an estimating unit 5312, the evaluating unit 5313, and the control moving amount estimating unit 5314.

Since the position data storage unit 5311, the estimating unit 5312, and the evaluating unit 5313 of the moving amount calculator 531' according to the second preferred embodiment have the similar configurations and functions to those of the position data storage unit 5311, the estimating unit 5312, and the evaluating unit 5313 according to the first preferred embodiment, the description thereof is omitted.

The control moving amount estimating unit 5314 calculates a control moving amount. The control moving amount is a moving amount that is calculated based on an acceleration command value and/or a speed command value output to a travelling unit 2 from the travelling controller 57 when the travelling unit 2 is controlled during a predetermined period in the movement of the autonomous mobile body 100.

The acceleration command value and/or the speed command value are included in the control command to be calculated by the travelling controller 57. Therefore, the control moving amount estimating unit 5314 is able to input the control command from the travelling controller 57.

The acceleration command value and/or the speed command value are represented typically by a relationship between the time during which the motors 23a and 23b are controlled and a moving speed (or rotational speeds of the motors 23a and 23b) of the autonomous mobile body 100 at the control time. Therefore, the control moving amount estimating unit 5314 integrates the acceleration command value and/or the speed command value represented by the relationship with respect to the control time by the time so as to be capable of estimating a moving amount of the autonomous mobile body 100 from the control command.

The moving amount that is estimated (calculated) based on the control command including the acceleration command value and/or the speed command value is referred to as "the control moving amount".

Further, in the second preferred embodiment, the evaluating unit 5313 evaluates the control moving amount as the maximum travelling amount. This is because the control moving amount corresponds to the moving amount of the autonomous mobile body 100 when a physical influence of the travelling unit 2 (sliding of the wheels 21a and 21b) is not taken into consideration, and the autonomous mobile body 100 mostly moves in a less moving amount than the control moving amount due to the above physical influence.

When the control moving amount is determined as the maximum travelling amount, an estimated moving amount is able to be evaluated more precisely by using a maximum moving amount in which travelling is enabled by the travelling command.

Further, the control moving amount is not limited to the moving amount to be estimated based on the acceleration command value and/or the speed command value included in the control command. As an alternative preferred embodiment, when rotational amounts of the wheels 21a and 21b (the motors 23a and 23b) are measured, the control moving amount may be calculated based on the rotating amounts of the wheels 21a and 21b.

Figure 8B:
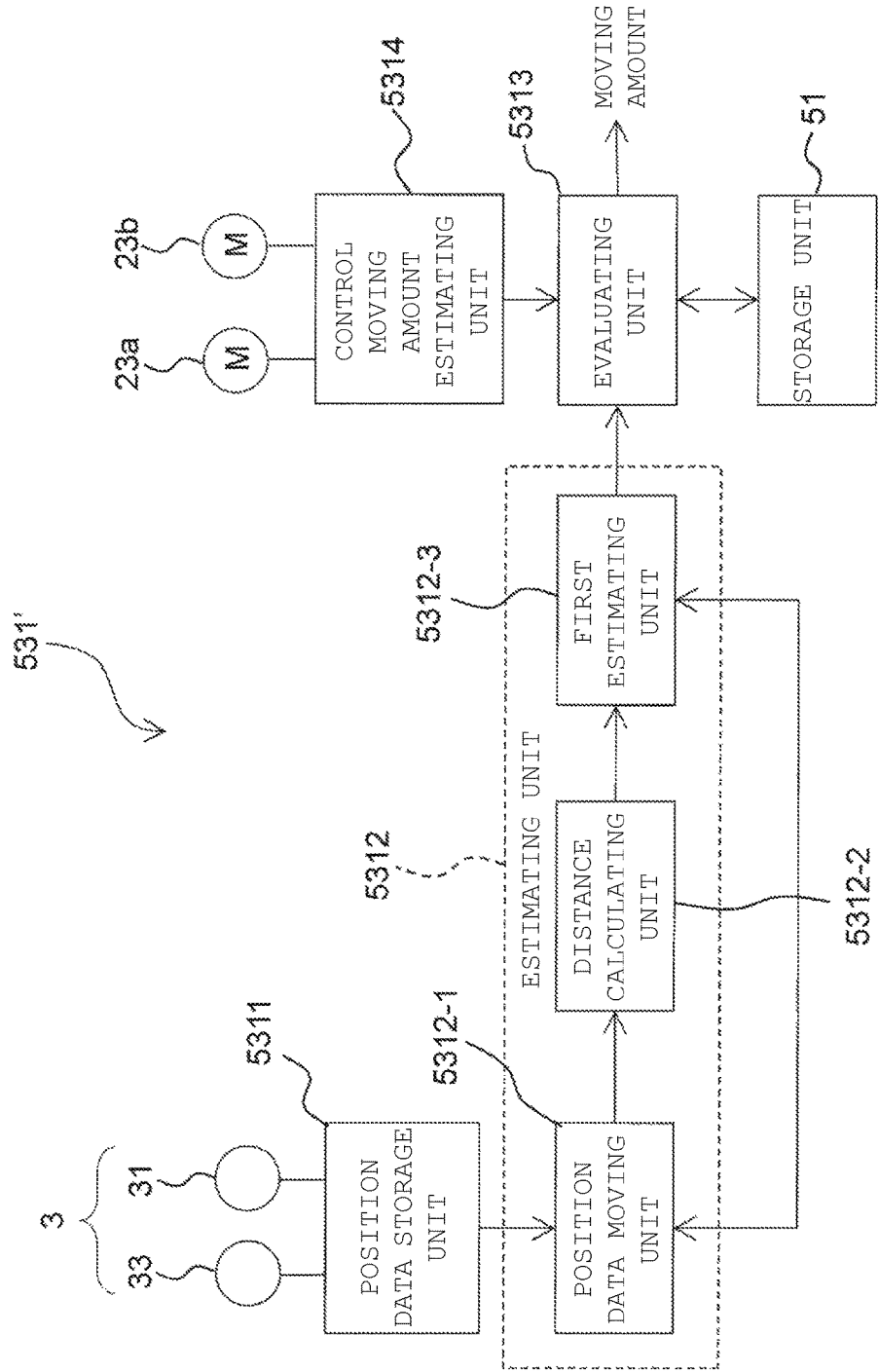
FIG. 8B is a diagram illustrating a configuration of the moving amount calculator that calculates a control moving amount based on a rotating amount of a wheel.

The control moving amount estimating unit 5314 measures the rotational amounts of the wheels 21a and 21b by pulse signals from encoders of the motors 23a and 23b as illustrated in FIG. 8B, and calculates the control moving amount based on the rotating amounts of (rotational amounts) of the wheels 21a and 21b during the predetermined period. The control moving amount obtained from the rotating amounts of the wheels 21a and 21b is referred to as a wheel moving amount. FIG. 8B is a diagram illustrating a configuration of the moving amount calculator that calculates the control moving amount based on the rotating amounts of the wheels.

The rotating amounts of the wheels 21a and 21b during the predetermined period preferably are calculated from, for example, a ratio between a pulse number included in a pulse signal during the predetermined period and pulse numbers included in pulse signals per rotation of the wheels 21a and 21b. Further, the wheel moving amount preferably is calculated based on, for example, the rotating amounts of the wheels 21a and 21b and circumferential lengths of the wheels 21a and 21b.

Typically, the wheel moving amount tends to be larger than the actual moving amount of the autonomous mobile body 100 due to slipping between the wheels 21a and 21b and a moving surface. Therefore, also the wheel moving amount is used as the maximum travelling amount in the evaluating unit 5313, an estimated moving amount is able to be evaluated more precisely.

Further, when the rotating amounts of the wheels 21a and 21b are measured and the estimated moving amount estimated by an estimating unit 5312 is determined as being inadequate, the evaluating unit 5313 may estimate the wheel moving amount calculated based on the rotating amounts of the wheels 21a and 21b as the moving amount of the autonomous mobile body 100. The wheel moving amount based on the rotating amounts of the wheels 21a and 21b tends to be larger than the actual moving amount due to slipping of the wheels 21*a* and 21*b*, and can be said to be a moving amount that is based on the travelling unit 2 more precisely than an inadequate estimated moving amount.

Therefore, when the estimated moving amount is determined as being inadequate, the wheel moving amount is estimated as the moving amount of the autonomous mobile body 100. As a result, a moving amount that is closer to an actual moving amount than an inadequate estimated moving amount is able to be estimated as the moving amount of the autonomous mobile body 100 during the predetermined period. That is to say, the moving amount is able to be estimated more accurately.

Also when the estimated moving amount is determined as being inadequate and the control moving amount is estimated as the moving amount of the autonomous mobile body 100, the similar effect can be produced.

Third Preferred Embodiment

In the first and second preferred embodiments, the estimating unit 5312 preferably estimates an estimated moving amount by the ICP method. However, the method to estimate the estimated moving amount is not limited to the ICP method. In a third preferred embodiment of the present invention, the estimated moving amount is estimated by a histogram matching method.

As illustrated in FIG. 9, the histogram matching method is a method to move, on the predetermined coordinate, a first histogram to be generated by coordinate values of a plurality of first position data on a predetermined coordinate or a second histogram to be generated by coordinate values of a plurality of second position data on a predetermined coordinate (in this preferred embodiment, the second histogram) so that the first histogram matches with the second histogram. FIG. 9 is a diagram schematically illustrating the histogram matching method.

In the histogram matching method, the determination is made whether the first histogram matches with the second histogram by determining whether a matching degree between the first histogram and the second histogram is maximum. In this preferred embodiment, the matching degree between the first histogram and the second histogram is calculated by using a cross correlation function. As described later, the cross correlation function is a function of a moving amount of the first histogram or the second histogram from an original histogram. In the histogram matching method, a value of the moving amount of the histogram that makes the cross correlation function (the matching degree) maximum is the estimated moving amount. In this preferred embodiment, the matching degree between the first histogram and the second histogram is calculated by the cross correlation function, but not limited to this, the matching degree between the first histogram and the second histogram may be calculated by suitably using a normalized cross correlation function or a zero-mean normalized cross correlation function.

The third preferred embodiment is different from the first and second preferred embodiments in that the estimating unit 5312 of a moving amount estimating unit 53 (a moving amount calculator 531) is configured or programmed to include a histogram generator 5312-4 and a second estimating unit 5312-5, and an evaluating unit 5313 evaluates a histogram moving amount based on a maximum travelling amount. Therefore, a configuration of a moving amount calculator 531 and an estimated moving amount estimating method according to a third preferred embodiment are described below. Since other configuration of an autonomous mobile body 100 is the same as the configurations in the first and second preferred embodiments, description thereof is omitted.

Figure 10:
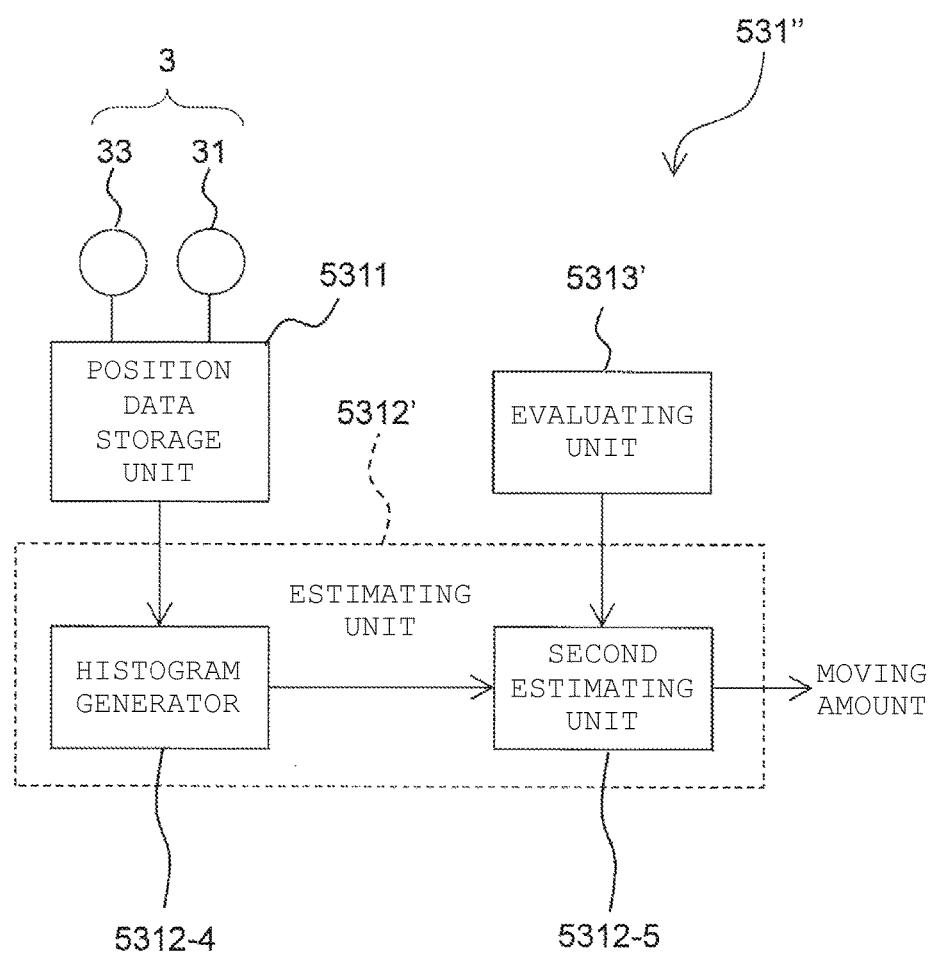
FIG. 10 is a diagram illustrating a configuration of the moving amount calculator according to a third preferred embodiment of the present invention.

A configuration of the moving amount calculator 531" according to the third preferred embodiment is described first with reference to FIG. 10. FIG. 10 is a diagram illustrating a configuration of the moving amount calculator according to the third preferred embodiment. As illustrated in FIG. 10, the moving amount calculator 531" according to the third preferred embodiment has a position data storage unit 5311, an estimating unit 5312', and the evaluating unit 5313'.

Since the position data storage unit 5311 has the similar configuration and function to those of the position data storage units according to the first and second preferred embodiments, description thereof is omitted.

The estimating unit 5312' estimates the estimated moving amount using the histogram matching method. Therefore, the estimating unit 5312' is configured or programmed to include the histogram generator 5312-4 and the second estimating unit 5312-5. The histogram generator 5312-4 generates the first histogram from the plurality of first position data, and generates the second histogram from the plurality of second position data.

The first histogram is a histogram to be generated from coordinate values of the plurality of first position data on a predetermined coordinate axis of a predetermined coordinate. The second histogram is a histogram to be generated from coordinate values of the plurality of second position data on a predetermined coordinate axis.

For example, when a predetermined coordinate is two-dimensional, frequencies of appearance of predetermined coordinate values on an X coordinate in the plurality of first position data and the plurality of second position data are counted for X coordinate values included in a predetermined range, and the X coordinate values are related to the appearance frequencies so that a first histogram $H11(X)$ and a second histogram $H21(X)$ that are functions of the X coordinate values are generated.

Further, similarly to the X coordinate values, a first histogram $H11(Y)$ and a second histogram $H21(Y)$ are generated for Y coordinate values.

In addition, in this preferred embodiment, a frequency of appearance of an angle defined by a straight line that connects predetermined position data and position data adjacent to the predetermined position data and a coordinate axis of a predetermined coordinate (in this preferred embodiment, the X axis, but not limited to the X axis and it may be Y axis) is generated as first histograms $H11(\theta)$ and $H21(\theta)$ of an attitude angle $\theta$ (can be defined as, for example, an angle between an advancing direction of the autonomous mobile body 100 and the X axis of the predetermined coordinate).

The second estimating unit 5312-5 calculates the cross correlation function between the first histogram and the second histogram. In this preferred embodiment, for example, the cross correlation function of the histogram of the attitude angle $\theta$ is calculated. Specifically, a function to which only a value of $\theta$ holding $H11(\theta)*H21(\theta-a)$ that is a product of $H11(\theta)$ and a histogram obtained by moving $H21(\theta)$ by "a" is added (can be said also as an integrated value of $H11(\theta)*H21(\theta-a)$ with respect to $\theta$) is calculated as the cross correlation function. The cross correlation function is able to be calculated similarly for a histogram of another coordinate axis.

The cross correlation function represents, as illustrated in FIG. 9, a matching degree between a histogram obtained by shifting the second histogram by "a" with respect to the attitude angle θ (and the coordinate axis) and the first histogram. As a result, the cross correlation function is considered to be a function of the shift amount "a" of the histogram.

Shifting the second histogram that is the function of the X coordinate value and the Y coordinate value corresponds to calculating moving position data through a parallel movement of the second position data by a moving only amount corresponding to the shift amount. On the other hand, shifting the second histogram that is the function of the attitude angle θ corresponds to calculating the moving position data through a rotational movement of the second position data by only a moving amount corresponding to the shift amount.

Further, when the cross correlation function obtains a maximum value, the second estimating unit 5312-5 determines that the first histogram and the second histogram shift by the value "a" are the most matched, and determines that a first projection object image to be formed by a plurality of first position data matches with a moving projection object image to be formed by a plurality of moving position data. The second estimating unit 5312-5 then estimates the value "a" at a time when the cross correlation function is maximum (namely, the moving amount of the second histogram) as a moving amount (the estimated moving amount) of the autonomous mobile body 100. As definition of "match the most" relating to first histogram and second histogram, "a state in which the cross correlation function obtains a maximum value" used in this preferred embodiment as well as "a state in which a total value of the cross correlation function in a certain change amount of the attitude angle (namely, a moving amount of a histogram) and a change amount of angles before and after the certain change amount becomes a maximum value" for the attitude angle θ may be suitably used.

The evaluating unit 5313' evaluates the moving amount that the first histogram or the second histogram is moved in the cross correlation function (namely, in the above example, the value "a"), as the data moving amount based on the maximum travelling amount. Specifically, the evaluating unit 5313' determines an upper limit value and/or a lower limit value of the moving amount in which the histogram is moved based on the maximum travelling amount.

In this preferred embodiment, since the maximum travelling amount corresponds to the maximum value of the moving amount of the autonomous mobile body 100 in view of a travelling performance of a travelling unit 2, the evaluating unit 5313' sets absolute values of the upper limit value and the lower limit value of the shift amount "a" as a maximum travelling amount. As a result, the second estimating unit 5312-5 scans the value "a" within a range of the maximum travelling amount and calculates the cross correlation function, so as to regard the maximum value of the cross correlation function within the range of the value "a" as a maximum value of an actual cross correlation function. That is to say, even when a true maximum value of the cross correlation function is present in the value "a" out of the range of the maximum travelling amount, the second estimating unit 5312-5 does not estimate the value "a" out of the range of the maximum travelling amount as the estimated moving amount of the autonomous mobile body 100.

When the absolute values of the upper limit value and the lower limit value of the value "a" is set as the maximum travelling amount, a useless movement of the first histogram or the second histogram is able to be repressed in a range of an inadequate estimated moving amount. As a result, an estimating time of the estimated moving amount using the cross correlation function is shortened, and the calculation of the estimated moving amount exceeding the moving performance of the travelling unit 2 in the histogram matching method is repressed.

Figure 11:
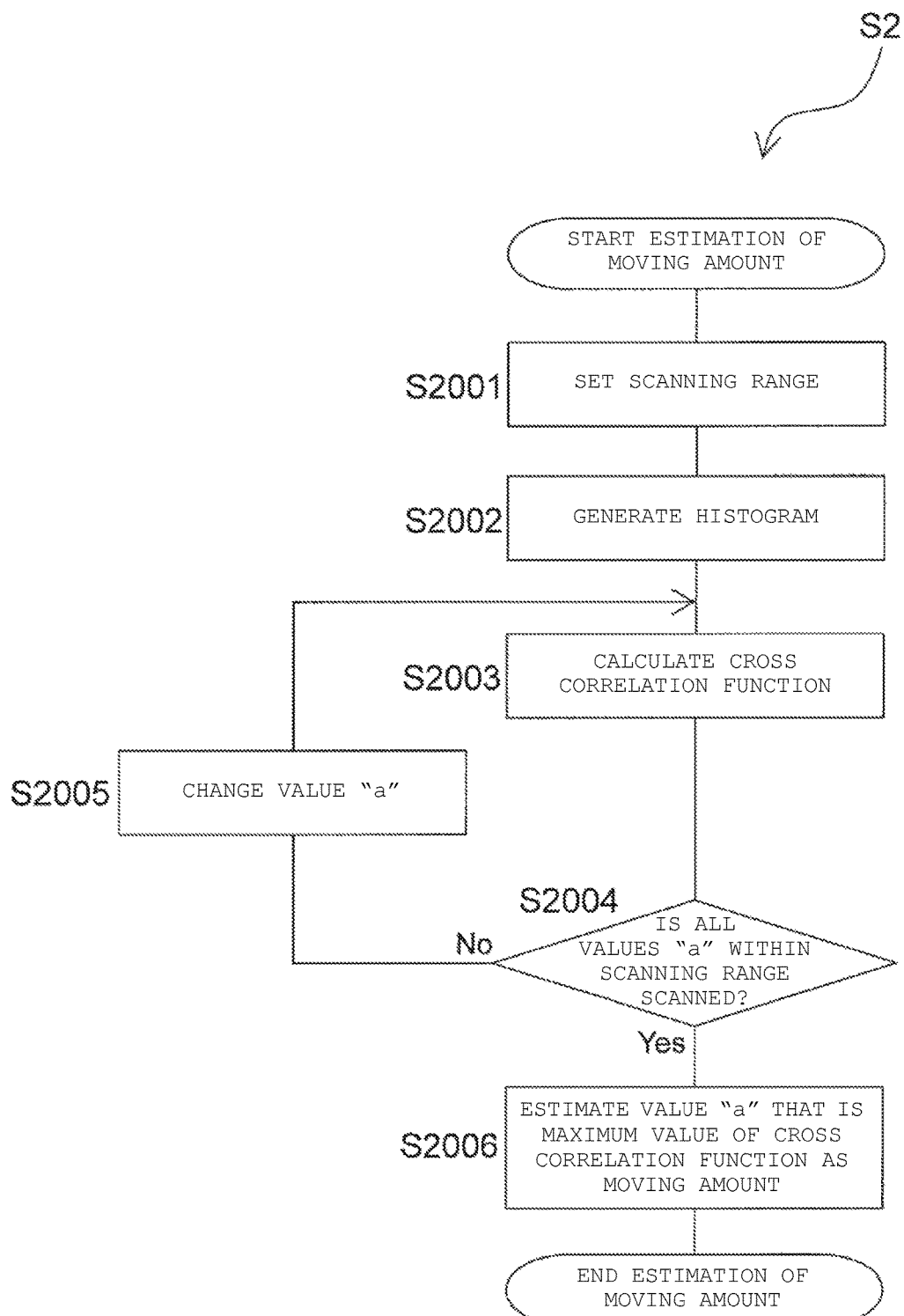
FIG. 11 is a flowchart illustrating the method to estimate the estimated moving amount according to the third preferred embodiment of the present invention.

The estimated moving amount estimating method according to the third preferred embodiment is described below with reference to FIG. 11. FIG. 11 is a flowchart illustrating the estimated moving amount estimating method according to the third preferred embodiment.

When the estimation of the estimated moving amount is started, the evaluating unit 5313' sets a scanning range of a moving amount (value "a") of a histogram in the second estimating unit 5312-5 (step S2001). The evaluating unit 5313' sets absolute values of a lower limit value and an upper limit value in a scanning range of a coordinate value of the histogram in the second estimating unit 5312-5 as the maximum travelling amount.

After the scanning range of the coordinate value of the histogram is set, the histogram generator 5312-4 generates the first histogram from the plurality of first position data and the second histogram from the plurality of second position data by using the above method (step S2002).

After the generation of the histogram, the second estimating unit 5312-5 calculates a formula of the cross correlation function between the first histogram and the second histogram as a function of the value "a" (step S2003). Thereafter, the second estimating unit 5312-5 calculates a value of the cross correlation function for a predetermined value "a" within the scanning range of the coordinate value, and relates the value "a" to the value of the cross correlation function so as to store the value in a storage unit 51.

After the cross correlation function is calculated for the predetermined value "a", the second estimating unit 5312-5 determines whether the cross correlation function is calculated for all the values "a" within the set scanning range (step S2004). When the determination is made that the values of the cross correlation function are not calculated for all the values "a" within the set scanning range ("No" at step S2004), the second estimating unit 5312-5 further changes the value "a" (step S2005).

After the change of the value "a", the process to estimate the moving amount returns to step S2003, and a new value of the cross correlation function is calculated for the value "a" changed from the previous value so as to be stored. That is to say, in the process to estimate the moving amount, the change of the value "a" and the calculation of the value of the cross correlation function are repeated for all the values "a" within the scanning range.

On the other hand, when the determination is made that the current value "a" reaches an upper limit value or a lower limit value within the scanning range and the values of the cross correlation function are calculated for all the values "a" within the scanning range ("Yes" at step S2004), the second estimating unit 5312-5 searches the stored values of the cross correlation function for the cross correlation function having a maximum value. Thereafter, the second estimating unit 5312-5 estimates the value "a" related to the cross correlation function having the maximum value as the estimated moving amount of the autonomous mobile body 100 (step S2006).

When the evaluating unit 5313' sets a moving range (the scanning range) of the coordinate value of the histogram (the second histogram) at step S2001, a repeat count of the change of the value "a" and the calculation of the value of the cross correlation function at steps S2003 to S2005 is able to be made to be small compared to the case that the value of the cross correlation function is calculated within a range of all possible values "a" (for example, a detecting range of the position data of a position data obtaining unit 3). As a result, an estimating time of the estimated moving amount is able to be made to be short compared to the case that the scanning is made for all the possible values "a".

Further, when the upper limit value and/or the lower limit value of the value "a" to calculate the cross correlation function are set as the maximum travelling amount, namely, the value "a" is scanned within a range where an absolute value is the maximum travelling amount or less and the value "a" that is the maximum value of the cross correlation function within the range of the value "a" is adopted as the moving amount of the autonomous mobile body 100 (the estimated moving amount), an unreasonable value "a" that exceeds the maximum travelling amount is prevented from being estimated as the estimated moving amount.

Fourth Preferred Embodiment

In the first to third preferred embodiments, the position estimating unit 55 preferably estimates the position of the autonomous mobile body 100 using only one estimated moving amount estimated from the plurality of position data obtained by the position data obtaining unit 3. However, not limited to this, in a fourth preferred embodiment of the present invention, a position estimating unit 55 inputs a plurality of estimated moving amounts, and estimates the position of the autonomous mobile body 100 based on the plurality of input estimated moving amounts. That is to say, in the fourth preferred embodiment, the position estimating unit 55 estimates a plurality of positions of the autonomous mobile body 100.

Further, in the fourth preferred embodiment, the position estimating unit 55 estimates a position whose matching result is the best in the plurality of estimated positions as the position of the autonomous mobile body 100. The fourth preferred embodiment is, therefore, different from the first to third preferred embodiments in that the position estimating unit 55 estimates a plurality of positions. Therefore, the following description is provided about a position estimating method in the position estimating unit 55 according to the fourth preferred embodiment, and the other configuration and the estimating method of the autonomous mobile body 100 are omitted.

Figure 12:
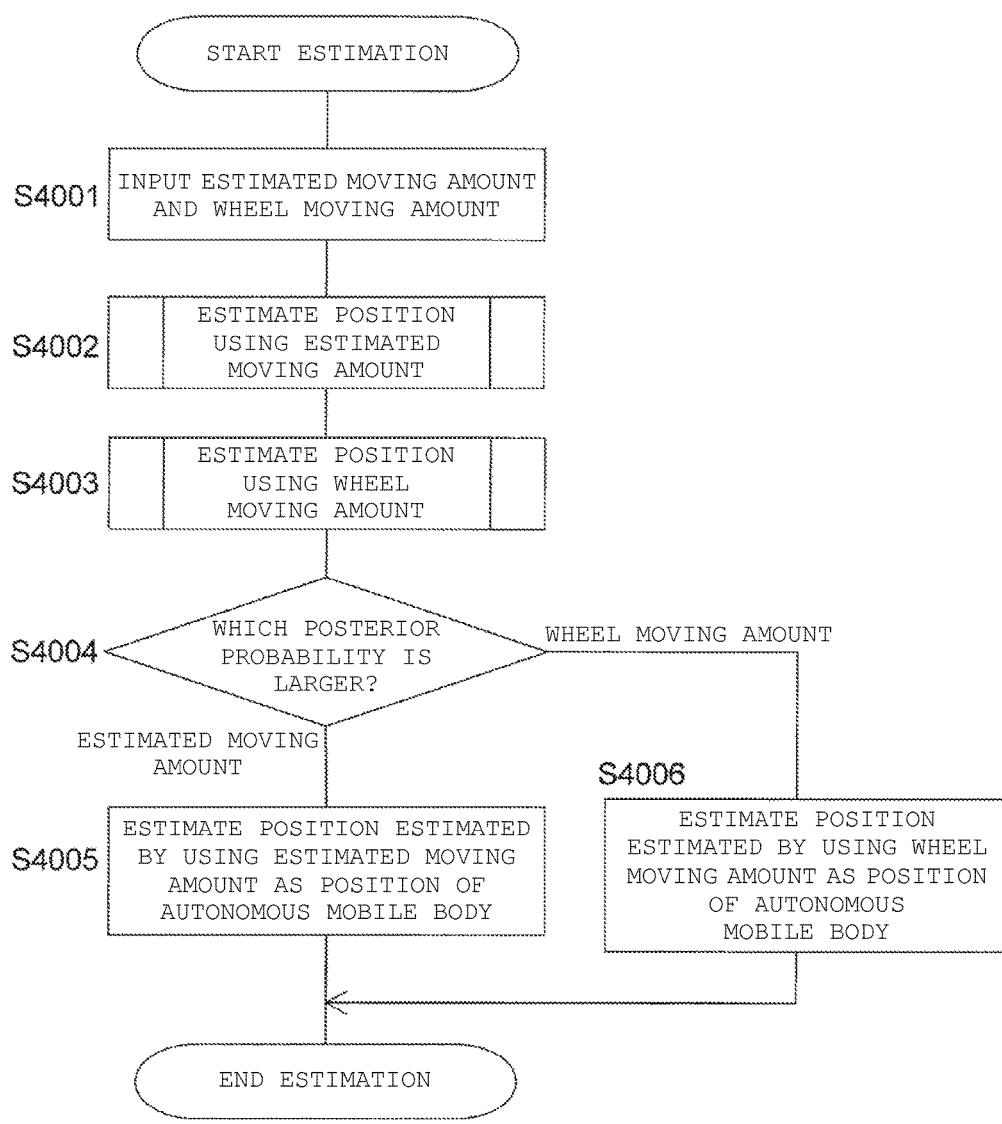
FIG. 12 is a flowchart illustrating a position estimating method according to a fourth preferred embodiment of the present invention.

The position estimating method in the fourth preferred embodiment is described below with reference to FIG. 12. FIG. 12 is a flowchart illustrating the position estimating method in the fourth preferred embodiment. The following description is provided of a state in which the position is estimated by using two moving amounts including the estimated moving amount estimated as described in the first to third preferred embodiments using the position data obtained by the position data obtaining unit 3, and the moving amount (the wheel moving amounts) of the autonomous mobile body 100 estimated based on rotating amounts of wheels 21a and 21b. The wheel moving amount is able to be calculated based on the rotating amounts of the wheels 21a and 21b before and after a movement and circumferential lengths of the wheels 21a and 21b ($2\pi$ times of the radii of the wheels 21a and 21b).

When the position estimating unit 55 starts to estimate the position of the autonomous mobile body 100, the position estimating unit 55 inputs the estimated moving amount estimated by using the plurality of position data and the wheel moving amount calculated (estimated) based on the rotating amounts of the wheels 21a and 21b (step S4001).

After the input of the estimated moving amount and the wheel moving amount, the position estimating unit 55 estimates the position of the autonomous mobile body 100 by the position estimating method described in the first preferred embodiment (the position estimating method through map matching) using the estimated moving amount as a moving amount to calculate "the temporary current position" described in the first preferred embodiment (step S4002).

At the same time of or after execution of step S4002, the position estimating unit 55 estimates the position of the autonomous mobile body 100 by the position estimating method described in the first preferred embodiment using the wheel moving amount as the moving amount to calculate "the temporary current position" (step S4003).

After the position of the autonomous mobile body 100 is estimated by using the estimated moving amount and the wheel moving amount, the position estimating unit 55 determines which is larger in a maximum value of a posterior probability distribution at a time of estimating the position using the estimated moving amount or a maximum value of a posterior probability distribution at a time of estimating the position using the wheel moving amount (step S4004).

The posterior probability is an index representing a level of the matching result, and as the matching result is better, namely, the position is estimated more accurately, the value becomes larger.

When the determination is made that the posterior probability at the time of estimating the position using the estimated moving amount is larger (at step S4004, "the estimated moving amount"), the position estimating unit 55 estimates the position estimated by using the estimated moving amount as the position of the autonomous mobile body 100 (step S4005).

On the other hand, when the determination is made that the posterior probability at the time of estimating the position using the wheel moving amount is larger (at step S4004, "the wheel moving amount"), the position estimating unit 55 estimates that the position estimated by using the wheel moving amount as the position of the autonomous mobile body 100 (step S4006). Thereafter, the position estimating process is ended.

When the position of the autonomous mobile body 100 is estimated by using the estimated values of a plurality of the moving amounts (not limited to two), and the estimated position of the autonomous mobile body 100 having the largest value of the posterior probability distribution is estimated as an actual position of the autonomous mobile body 100, so that the position of the autonomous mobile body 100 is estimated more accurately than a case using one moving amount.

Alternative Preferred Embodiment

Various preferred embodiments of the present invention are described above, but the present invention is not limited to the above preferred embodiments, and various modifications can be made within a range that does not deviate from the subject matter of the present invention. In particular, the plurality of preferred embodiments and alternative preferred embodiments described in this specification can be combined as needed or desired. For example, all the first to fourth preferred embodiments may be combined. As a result, all effects described in the first to fourth preferred embodiments can be provided to the autonomous mobile body 100.

Alternative Preferred Embodiment of Travelling Unit

The travelling unit 2 according to the first preferred embodiment preferably is a two-wheel differential travelling unit, for example. However, not limited to this, a travelling unit including another wheel such as an omni wheel may be used. Further, the travelling unit 2 is not limited to one that moves through the rotation of the wheels 21a and 21b, and may be a travelling unit that is moved by a motion of any actuator other than wheels.

Alternative Preferred Embodiment of Moving Amount Estimating Unit

In the first to fourth preferred embodiments, when the wheel moving amount is calculated based on the rotating amounts of the wheels 21a and 21b, the calculated wheel moving amount preferably is not particularly corrected. However, not limited to this, the wheel moving amount may be corrected by using an estimated moving amount estimated by using a plurality of position data. As a result, for example, even when the diameters of the wheels 21a and 21b are changed due to use of the wheels 21a and 21b, a moving amount of the autonomous mobile body 100 is able to be estimated accurately based on the rotating amounts of the wheels 21a and 21b.

Alternative Preferred Embodiment of Moving Amount Calculating Method

In the first to fourth preferred embodiments, the moving amount estimating unit 53 preferably estimates the moving amount from the plurality of position data using only any one of the ICP method and the histogram matching method. However, the method is not limited to this. In the moving amount estimating unit 53, the ICP method and the histogram matching method may be combined so as to estimate the moving amount from the plurality of position data.

For example, a moving amount of a rotational movement of the autonomous mobile body 100 (an attitude angle change) is calculated by using the plurality of position data by the histogram matching method, and then a moving amount of a parallel movement (a translation motion) may be calculated by the ICP method. As a result, when the moving amount of the translation motion is estimated, the estimation of the moving amount of the translation motion is reduced in a state of deviating from a rotational center.

Alternative Preferred Embodiment of Main Body

The main body 1 of the autonomous mobile body 100 according to the first to fourth preferred embodiments preferably is not particularly mounted with a member that interferes with a position data detectable region of the position data obtaining unit 3. However, not limited to this, the main body 1 may be mounted with a known-shaped interference member so that at least a portion of the member enters the position data detectable region of the position data obtaining unit 3.

The main body 1 is mounted with the interference member so that at least a portion of the member enters the position data detectable region, so that a check can be made whether the position data obtaining unit 3 normally operates. For example, when an object such as a wall or an obstacle is not present around the autonomous mobile body 100 and a projection object image corresponding to the shape of the portion of the interference member is formed by some of the plurality of position data, the determination can be made not that position data are not obtained due to a malfunction of the position data obtaining unit 3 but that the autonomous mobile body 100 is moving in a wide space where no object is present.

Alternative Preferred Embodiment of Maximum Travelling Amount

In the first to fourth preferred embodiments, the value of the maximum travelling amount preferably is not provided with ranges. However, not limited to this, the value of the maximum travelling amount may be provided with a certain range. As a result, when the estimated moving amount slightly exceeds the maximum travelling amount but an exceeding amount is within an acceptable range (within a certain range), the estimated moving amount is able to be determined as the adequate estimated moving amount. Further, the range provided to the maximum travelling amount may be differed depending on, for example, a travelling state. For example, when the movement of the autonomous mobile body 100 is determined to be limited to an advancing movement, a maximum travelling amount of a reversing direction may be made to be small. As a result, when the autonomous mobile body 100 is estimated to be moved to the reversing direction where the autonomous mobile body 100 cannot originally move, the estimated moving amount is able to be determined as a more inadequate estimated moving amount.

Alternative Preferred Embodiment of Method for Evaluating the Moving Amount Estimated by Histogram Matching Method In the third preferred embodiment, the evaluating unit 5313' sets the absolute values of the upper limit value and the lower limit value of the value "a" of the cross correlation function within the scanning range as the maximum travelling amount. That is to say, in the third preferred embodiment, the value "a" is scanned within the range of the adequate moving amount.

However, the method for evaluating the moving amount estimated by the histogram matching method is not limited to this. For example, the scanning range of the value "a" of the cross correlation function is not particularly limited, and the evaluating unit 5313' may evaluate whether (the absolute value of) the value "a" for making the cross correlation function maximum is larger than the maximum travelling amount.

At this time, for example, when (the absolute value of) the value "a" for making the cross correlation function maximum is larger than the maximum travelling amount, the evaluating unit 5313' evaluates the value "a" as being inadequate to discard the value "a". On the other hand, when (the absolute value of) the value "a" is the maximum travelling amount or less, the evaluating unit 5313' evaluates the value "a" as being adequate so as to adopt the value "a" as the moving amount of the autonomous mobile body 100.

Alternatively, as described in the first preferred embodiment, a calculated value of the cross correlation function when (the absolute value of) the value "a" is the maximum travelling amount or less is stored in the storage unit 51, and when (the absolute value of) the value "a" finally calculated is larger than the maximum travelling amount, the value "a" in the stored values "a" at the time of the maximum calculated value of the cross correlation function may be adopted as the moving amount of the autonomous mobile body 100.

The adequate estimated moving amount obtained by the histogram matching method may be adopted as the moving amount of the autonomous mobile body 100 also by making the evaluation whether the value "a" is adequate based on whether the value "a" for making the cross correlation function maximum is larger than the maximum travelling amount.

Preferred embodiments of the present invention can be widely applied to mobile bodies that can move while estimating a position of a main body, for example.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A moving amount estimating apparatus that estimates a moving amount of a mobile body including a travelling unit, the apparatus comprising:
 a position data obtaining unit that obtains a plurality of position data forming a projection object image obtained by projecting an object present around the mobile body onto a predetermined coordinate;
 an estimating unit that estimates, when a plurality of moving position data are calculated such that a first projection object image data formed by a plurality of first position data obtained one of before and after the mobile body moves during a predetermined time interval matches with a moving projection object image formed by a plurality of moving position data obtained by a movement of the mobile body during the predetermined time interval of a plurality of second position data obtained the other of before and after the movement on the predetermined coordinate, the moving amount of the mobile body during the predetermined time interval from the plurality of second position data as an estimated moving amount in which the mobile body moves during the predetermined time interval; and
 an evaluating unit that evaluates a data moving amount that is the moving amount of the mobile body during the predetermined time interval on the predetermined coordinate when the plurality of moving position data are calculated from the plurality of second position data based on a maximum travelling amount in which the mobile body is enabled to travel by the travelling unit during the predetermined time interval, and stores the data moving amount evaluated as the moving amount of the mobile body, wherein
 the estimating unit performs a subsequent estimation according to the stored data moving amount.

2. The moving amount estimating apparatus according to claim 1, wherein when the data moving amount is larger than the maximum travelling amount, the evaluating unit does not store the data moving amount as the moving amount of the mobile body.

3. The moving amount estimating apparatus according to claim 1, wherein when the estimated moving amount is evaluated as the data moving amount and the data moving amount is not stored as the moving amount of the mobile body, the evaluating unit adopts the maximum travelling amount as the moving amount in which mobile body moves during the predetermined time interval.

4. The moving amount estimating apparatus according to claim 1, wherein
 the mobile body includes a travelling controller that controls the travelling unit; and
 the moving amount estimating apparatus further comprises:
 a control moving amount estimating unit that estimates a control moving amount to be calculated based on an acceleration command value and/or a speed command value output to the travelling unit by the travelling controller when the travelling unit is controlled during the predetermined time interval as the moving amount of the mobile body during the predetermined time interval;
 the evaluating unit evaluates the data moving amount with the control moving amount being used as the maximum travelling amount.

5. The moving amount estimating apparatus according to claim 4, wherein the evaluating unit evaluates the estimated moving amount as the data moving amount, and when the data moving amount is not stored as the moving amount of the mobile body, the evaluating unit adopts the control moving amount as the moving amount in which the mobile body moves during the predetermined time interval.

6. The moving amount estimating apparatus according to claim 4, wherein
 the travelling unit includes wheels, and travels via rotation of the wheels;
 the control moving amount estimating unit calculates a wheel moving amount calculated based on a rotating amount of the wheels during the predetermined time interval as the control moving amount.

7. The moving amount estimating apparatus according to claim 6, wherein the evaluating unit evaluates the estimated moving amount as the data moving amount, and when the data moving amount is not stored as the moving amount of the mobile body, the evaluating unit adopts the wheel moving amount as the moving amount in which the mobile body moves during the predetermined time interval.

8. The moving amount estimating apparatus according to claim 1, wherein the evaluating unit evaluates a product of a maximum translation speed and/or a maximum rotation speed of the mobile body and the predetermined time interval as the maximum travelling amount.

9. The moving amount estimating apparatus according to claim 1, wherein the estimating unit includes:
 a distance calculating unit that calculates a distance between the first projection object image and the moving projection object image; and
 a first estimating unit that determines, based on a comparison of the distance between the first projection object image and the moving projection object image with a predetermined threshold, whether the first projection object image matches with the moving projection object image, and estimates the moving amount of the mobile body during the predetermined time interval of the plurality of moving position data with respect to the plurality of second position data as the estimated moving amount when the moving projection object image matches with the first projection object image.

10. The moving amount estimating apparatus according to claim 9, wherein the evaluating unit evaluates the estimated moving amount estimated by the first estimating unit as the data moving amount, and when evaluating that the data moving amount according to the estimation by the first estimating unit is not stored as the moving amount of the mobile body, the evaluating unit discards the estimated moving amount estimated by the first estimating unit.

11. The moving amount estimating apparatus according to claim 1, wherein the estimating unit includes:
 a histogram generator that generates a first histogram based on coordinate values of the plurality of first position data on a predetermined coordinate axis of the predetermined coordinate and a second histogram based on coordinate values of the plurality of second position data on the predetermined coordinate axis; and
 a second estimating unit that determines that the first projection object image matches with the moving projection object image when a matching degree between the first histogram and the second histogram is maximum, and estimates a moving amount of the first histogram or the second histogram when the matching degree becomes maximum as the estimated moving amount.

12. The moving amount estimating apparatus according to claim 11, wherein the evaluating unit evaluates the moving amount in which the first histogram or the second histogram is moved in the calculation of the matching degree as the data moving amount.

13. The moving amount estimating apparatus according to claim 12, wherein the evaluating unit sets an absolute value of an upper limit value and/or a lower limit value of the moving amount in which the first histogram or the second histogram is moved as the maximum travelling amount.

14. An autonomous mobile body comprising:
the moving amount estimating apparatus according to claim 1;
a travelling unit;
a position estimating unit that estimates a current position based on a moving amount to be estimated in the moving amount estimating apparatus; and
a travelling controller that controls the travelling unit so that the travelling unit travels from the current position to a predetermined target position.

15. A moving amount estimating method to estimate a moving amount of a mobile body including a travelling unit, the method comprising:
obtaining a plurality of position data forming a projection object image obtained by projecting an object present around the mobile body onto a predetermined coordinate before and after the mobile body moves during a predetermined time interval;
estimating, when a plurality of moving position data are calculated such that a first projection object image data formed by a plurality of first position data obtained one of before and after a movement matches with a moving projection object image formed by a plurality of moving position data obtained by a movement of the mobile body during the predetermined time interval of a plurality of second position data obtained the other of before and after the movement on the predetermined coordinate, the moving amount of the mobile body during the predetermined time interval of the plurality of moving position data from the plurality of second position data as an estimated moving amount in which the mobile body moves during the predetermined time interval;
evaluating a data moving amount that is the moving amount of the mobile body during the predetermined time interval on the predetermined coordinate when the plurality of moving position data are calculated from the plurality of second position data, based on a maximum travelling amount in which the mobile body is enabled to travel by the travelling unit during the predetermined time interval; and
storing the data moving amount evaluated as the moving amount of the mobile body, wherein
a subsequent estimating step is performed according to the stored data moving amount.

\* \* \* \* \*